United States Patent
Yuan et al.

(10) Patent No.: US 11,811,495 B2
(45) Date of Patent: Nov. 7, 2023

(54) METHOD FOR SENDING SYNCHRONIZATION SIGNAL BY RELAY NODE, AND APPARATUS

(71) Applicant: Huawei Technologies Co., Ltd., Shenzhen (CN)

(72) Inventors: Shitong Yuan, Shenzhen (CN); Mingzeng Dai, Shenzhen (CN); You Li, Shenzhen (CN); Xiaoli Shi, Shanghai (CN); Rui Wang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 43 days.

(21) Appl. No.: 16/990,483

(22) Filed: Aug. 11, 2020

(65) Prior Publication Data

US 2021/0013959 A1 Jan. 14, 2021

Related U.S. Application Data

(63) Continuation of application No. PCT/CN2019/072615, filed on Jan. 22, 2019.

(30) Foreign Application Priority Data

Feb. 12, 2018 (CN) .......................... 201810147102.4

(51) Int. Cl.
*H04B 7/155* (2006.01)
*H04B 7/212* (2006.01)
*H04W 56/00* (2009.01)

(52) U.S. Cl.
CPC ....... *H04B 7/2125* (2013.01); *H04B 7/15571* (2013.01); *H04W 56/001* (2013.01)

(58) Field of Classification Search
None
See application file for complete search history.

(56) References Cited

U.S. PATENT DOCUMENTS

| 9,949,246 B2 | 4/2018 | Li et al. |
| 10,944,519 B2 | 3/2021 | Gou et al. |

(Continued)

FOREIGN PATENT DOCUMENTS

| CN | 101938775 A | 1/2011 |
| CN | 101958743 A | 1/2011 |

(Continued)

OTHER PUBLICATIONS

3GPP TS 38.473 V15.0.0 (Dec. 2017), 3rd Generation Partnership Project; Technical Specification Group Radio Access Network; NG-RAN; F1 application protocol (F1AP)(Release 15), 90 pages.

(Continued)

*Primary Examiner* — Alpus Hsu
(74) *Attorney, Agent, or Firm* — Slater Matsil, LLP

(57) ABSTRACT

A method for sending a synchronization signal in a relay system, and the method includes receiving, by a relay node, synchronization signal information sent by a parent node through an air interface, where the synchronization signal information comprises at least one of a subcarrier spacing of a synchronization signal, information about an operating frequency band of the relay node, information about a physical broadcast channel of the relay node, a synchronization signal periodicity, or indication information of a synchronization signal obtaining manner, and sending, by the relay node, the synchronization signal based on the synchronization signal information.

17 Claims, 14 Drawing Sheets

(56) References Cited

U.S. PATENT DOCUMENTS

| | | |
|---|---|---|
| 2009/0296953 A1 | 12/2009 | Sakata et al. |
| 2011/0103291 A1 | 5/2011 | Wiberg et al. |
| 2013/0208649 A1 | 8/2013 | Waldhauser et al. |
| 2015/0111574 A1* | 4/2015 | Fukumasa ................ H04W 4/70 455/435.1 |
| 2015/0296467 A1* | 10/2015 | Kim ...................... H04W 76/27 370/330 |
| 2016/0227518 A1 | 8/2016 | Li et al. |
| 2017/0094547 A1* | 3/2017 | Yum .................. H04W 56/001 |
| 2017/0318522 A1* | 11/2017 | Ly ........................ H04L 5/0048 |
| 2018/0027475 A1* | 1/2018 | Li ........................ H04W 24/02 455/426.1 |
| 2018/0160382 A1* | 6/2018 | Hou ........................ H04W 4/00 |
| 2018/0368016 A1* | 12/2018 | Lee ...................... H04B 17/318 |
| 2019/0215788 A1 | 7/2019 | Zhang et al. |
| 2020/0296765 A1* | 9/2020 | Kim ...................... H04W 48/10 |
| 2020/0305098 A1* | 9/2020 | Kim ........................ H04J 11/00 |

FOREIGN PATENT DOCUMENTS

| | | |
|---|---|---|
| CN | 102474802 A | 5/2012 |
| CN | 102792762 A | 11/2012 |
| CN | 104796368 A | 7/2015 |
| CN | 105517139 A | 4/2016 |
| CN | 105706512 A | 6/2016 |
| CN | 106575993 A | 4/2017 |
| CN | 106688288 A | 5/2017 |
| KR | 20160064172 A | 6/2016 |
| WO | 2017217719 A1 | 12/2017 |
| WO | 2018014781 A1 | 1/2018 |
| WO | 2018014831 A1 | 1/2018 |

OTHER PUBLICATIONS

3GPP TS 36.300 V15.0.0 (Dec. 2017), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15), 338 pages.

3GPP TS 37.324 V1.1.0 (Oct. 2017), 3rd Generation Partnership Project; Technical Specification Group Radio Access Network; E-UTRA and NR; Service Data Adaptation Protocol (SDAP) specification (Release 15), 15 pages.

Samsung, "Remaining aspects of Minimum System Information contents", 3GPP TSG-RAN2 Adhoc, R2-1706830, (Update of R2-1705334), Jun. 27-29, 2017, 8 pages, Qingdao, China.

\* cited by examiner

METHOD FOR SENDING SYNCHRONIZATION SIGNAL BY RELAY NODE, AND APPARATUS

CROSS-REFERENCE TO RELATED APPLICATIONS

This application is a continuation of International application No. PCT/CN2019/072615, filed on Jan. 22, 2019, which claims priority to Chinese Patent Application No. 201810147102.4, filed on Feb. 12, 2018. The disclosures of the aforementioned applications are hereby incorporated by reference in their entireties.

TECHNICAL FIELD

The present invention relates to communications technologies, and in particular, to a method for sending a synchronization signal by a relay node in a wireless communications system, and an apparatus.

BACKGROUND

A high bandwidth is an inevitable requirement on new radio (NR) development of a future wireless network, including a 5th generation (5G) wireless network. Because a bandwidth is gradually exhausted in a low frequency band, for example, a frequency band below 6 GHz (Gigahertz), a high frequency band becomes an available frequency band for a future wireless network. In current NR research, a high frequency band (for example, a frequency band of 20-30 GHz) and a frequency band of 6 GHz are important frequency bands for NR bandwidth expansion. In addition, introducing a relay node (RN) whose coverage is expanded is an important means to expand a capacity and coverage of a network. Currently, in NR, high frequency band applications are considered, and beam-based transmission is used, so that NR is quite different from a conventional long term evolution (LTE) system. This difference causes some problems that need to be overcome in relay node deployment and that a conventional network does not have.

SUMMARY

Embodiments of this application provide a method for sending a synchronization signal by a relay node, and an apparatus, to resolve a problem of, when the relay node may be configured as a layer 2 relay or layer 3 relay, how does a relay node obtain synchronization signal information from a network and send a synchronization signal through an air interface based on the synchronization signal information.

To achieve the foregoing objective, the following technical solutions are used in the embodiments of this application.

According to a first aspect, a method for sending a synchronization signal is provided. The method includes: receiving, by a relay node, synchronization signal information sent by a parent node through an air interface, where the synchronization signal information includes at least one of the following information: a subcarrier spacing of a synchronization signal, information about an operating frequency band of the relay node, information about a physical broadcast channel (PBCH) of the relay node, a synchronization signal periodicity, and indication information of a synchronization signal obtaining manner, and sending, by the relay node, the synchronization signal based on the synchronization signal information. In the foregoing technical solution, the relay node sends the synchronization signal information by using an air interface message, and the air interface message may include a radio resource control (RRC) message, such as an RRC reconfiguration message or an RRC connection re-establishment message, or may be a media access control (MAC) control element (CE). Transmission through the air interface can effectively reduce deployment costs and implement fast deployment. In addition, the synchronization signal information is automatically obtained through the air interface, so that manual configuration can be avoided and configuration efficiency can be improved. In addition, because NR supports a bandwidth part function, different relay nodes in a cell and a donor node may operate in a same bandwidth part or different bandwidth parts, to better adapt to service requirements at different positions in the cell. Therefore, the synchronization signal information of the relay node is configured through the air interface, so that this configuration manner has greater flexibility and a greater degree of freedom, to adapt to a requirement of a network service change.

In a possible implementation of the first aspect, the relay node sends a synchronization signal information request to the parent node, to request to obtain the synchronization signal information of the relay node. In the foregoing technical solution, the relay node actively sends the synchronization signal information request to the parent node, and the relay node may determine, based on a current status, a time for obtaining the synchronization signal information, so that air interface transmission efficiency is higher.

In a possible implementation of the first aspect, the synchronization signal includes a synchronization signal sequence, and the synchronization signal information further includes a physical cell identifier (PCI), so that the relay node generates the synchronization signal sequence based on the PCI. In the foregoing technical solution, the relay node may determine, by using the PCI in the synchronization signal information, the synchronization signal sequence sent by the relay node.

In a possible implementation of the first aspect, the synchronization signal information further includes information about a bandwidth part corresponding to the synchronization signal information, so that the relay node sends the synchronization signal in the bandwidth part based on the information about the bandwidth part corresponding to the synchronization signal information. In the foregoing technical solution, the synchronization signal in the bandwidth part is configured, so that relay nodes can be configured in different bandwidth parts more flexibly based on a service distribution status in the cell, to meet different service requirements in the cell.

In a possible implementation of the first aspect, the synchronization signal information further includes a transmit power corresponding to the synchronization signal, so that the relay node sends the synchronization signal at the transmit power. In the foregoing technical solution, the transmit power is configured, so that the relay node can send different synchronization signal/physical broadcast channel blocks at a same power or different powers, or transmit powers for a part of synchronization signal/physical broadcast channel blocks are different from transmit powers for another part of synchronization signal/physical broadcast channel blocks, so that channel statuses in different directions can be adapted to and a coverage requirement of the relay node can be met.

In a possible implementation of the first aspect, the method for sending a synchronization signal further includes: receiving, by the relay node, an identifier of the relay node that is sent by the parent node, and obtaining the synchronization signal information of the relay node based on the identifier of the relay node. In the foregoing technical solution, the relay node can determine, by using the identifier of the relay node, whether the parent node configures or reconfigures the synchronization signal information for the relay node, to avoid an incorrect configuration caused by lack of the identifier.

In a possible implementation of the first aspect, the method for sending a synchronization signal further includes: receiving, by the relay node, an identifier of another relay node and synchronization signal information of the another relay node that are sent by the parent node, and forwarding the identifier of the another relay node and the synchronization signal information of the another relay node to the another relay node. In the foregoing technical solution, the relay node can determine, by using the identifier of the another relay node, a child relay node to which the synchronization signal information is forwarded, to ensure that the child relay node can correctly receive the synchronization signal information.

According to a second aspect, a method for sending synchronization signal information is provided. The method includes: sending, by a network node, synchronization signal information to a relay node through an air interface, where the synchronization signal information includes at least one of the following information: a subcarrier spacing of a synchronization signal, information about an operating frequency band of the relay node, information about a physical broadcast channel of the relay node, a synchronization signal periodicity, and indication information of a synchronization signal obtaining manner, and receiving, by the network node, an acknowledgment message sent by the relay node. In the foregoing technical solution, the network node configures the synchronization signal information for the relay node through the air interface, so that deployment costs can be effectively reduced and fast deployment can be implemented. In addition, the synchronization signal information is automatically obtained through the air interface, so that manual configuration can be avoided and configuration efficiency can be improved. In addition, because NR supports a bandwidth part function, the network node may configure, based on a service requirement in a current cell, relay nodes to operate in a same bandwidth part (BWP) or different BWPs, to improve flexibility and a degree of freedom of service deployment.

In a possible implementation of the second aspect, the network node receives a synchronization signal information request sent by the relay node, where the synchronization signal information request is used to request the network node to send the synchronization signal information of the relay node to the relay node. In the foregoing technical solution, a network node may configure the synchronization signal information for the relay node based on the request, to ensure that the relay node that needs to obtain the synchronization signal information is configured, so that signaling efficiency is high.

In a possible implementation of the second aspect, the network node receives a synchronization signal information configuration request sent by an operation, administration and maintenance node, where the synchronization signal information configuration request is used to indicate the network node to send the synchronization signal information to the relay node. In the foregoing technical solution, the operation, administration and maintenance node controls the network node to send the synchronization signal information to the relay node, so that security of relay node management is improved. Through unified management performed by the operation, administration and maintenance node, deployment of the relay node in the network can be optimized.

In a possible implementation of the second aspect, the synchronization signal includes a synchronization signal sequence, and the synchronization signal information further includes a physical cell identifier PCI, so that the relay node generates the synchronization signal sequence based on the PCI. In the foregoing technical solution, the network node configures the PCI for the relay node, to control whether the synchronization signal of the relay node is the same as a synchronization signal of the network node, and configures the relay node as a layer 2 relay or a layer 3 relay as required, to optimize service transmission in the cell.

In a possible implementation of the second aspect, the synchronization signal information further includes information about a bandwidth part corresponding to the synchronization signal information, so that the relay node sends the synchronization signal in the bandwidth part based on the information about the bandwidth part corresponding to the synchronization signal information. In the foregoing technical solution, the synchronization signal in the bandwidth part is configured, so that relay nodes can be configured in different bandwidth parts more flexibly based on a service distribution status in the cell, to meet different service requirements in the cell.

In a possible implementation of the second aspect, the synchronization signal information further includes a transmit power corresponding to the synchronization signal. In the foregoing technical solution, the transmit power is configured, so that the relay node can send different synchronization signal/physical broadcast channel blocks at a same power or different powers, or transmit powers for a part of synchronization signal/physical broadcast channel blocks are different from transmit powers for another part of synchronization signal/physical broadcast channel blocks, so that channel statuses in different directions can be adapted to and a coverage requirement of the relay node can be met.

In a possible implementation of the second aspect, the method for sending a synchronization signal further includes: sending, by a parent node, an identifier of the relay node and the synchronization signal information to the relay node, so that the relay node obtains the synchronization signal information of the relay node based on the identifier of the relay node. In the foregoing technical solution, the network node indicates, by using the identifier of the relay node, that the synchronization signal information is configured for the relay node corresponding to the identifier of the relay node, to avoid an error generated when a plurality of relay nodes are configured or reconfigured at one time.

In a possible implementation of the second aspect, the network node sends an identifier of another relay node and synchronization signal information of the another relay node to the relay node, so that the relay node forwards the identifier of the another relay node and the synchronization signal information of the another relay node to the another relay node. In the foregoing technical solution, the network node may configure a plurality of relay nodes at one time, and the relay node can correctly obtain, by using the identifier of the another relay node, the synchronization signal information of the relay node, so that configuration efficiency is improved and configuration signaling is reduced, in addition, the identifier of the another relay node can help the relay node correctly forward and route the synchronization signal information.

According to another aspect of this application, a relay device is provided. The relay device is configured to implement a function of the method for sending a synchronization signal according to any one of the first aspect or the possible implementation of the first aspect. The function may be implemented by hardware, or may be implemented by hardware executing corresponding software. The hardware or the software includes one or more units corresponding to the foregoing function.

In a possible implementation, a structure of the relay device includes a processor and a memory. The memory stores code and data, the memory is coupled to the processor, and the processor is configured to support the relay device in performing the method for sending a synchronization signal according to any one of the first aspect or the possible implementations of the first aspect. Optionally, the relay device may further include a communications interface, and the communications interface is coupled to the processor or the memory.

According to another aspect of this application, a network device is provided. The network device is configured to implement a function of the method for sending synchronization signal information according to any one of the second aspect or the possible implementations of the second aspect. The function may be implemented by hardware, or may be implemented by hardware executing corresponding software. The hardware or the software includes one or more units corresponding to the foregoing function.

In a possible implementation, a structure of the network device includes a processor and a memory. The memory stores code required by the processor and/or a baseband processor, the memory is coupled to the processor, and the processor and/or the baseband processor are/is configured to support the network device in performing the function of the method for sending a synchronization signal according to any one of the second aspect or the possible implementations of the second aspect. Optionally, the network device may further include a communications interface, and the communications interface is coupled to the memory or the processor.

According to another aspect of this application, a computer-readable storage medium is provided. The computer-readable storage medium stores an instruction, and when the instruction is run on a computer, the computer is enabled to perform the method for sending a synchronization signal according to any one of the first aspect or the possible implementations of the first aspect, or the method for sending a synchronization signal according to any one of the second aspect or the possible implementations of the second aspect.

According to another aspect of this application, a computer program product including an instruction is provided. When the computer program product runs on a computer, the computer is enabled to perform the method for sending a synchronization signal according to any one of the first aspect or the possible implementations of the first aspect, or perform the method for sending a synchronization signal according to any one of the second aspect or the possible implementations of the second aspect.

According to another aspect of this application, a communications system is provided. The communications system includes a plurality of devices, and the plurality of devices include a relay device and a network device. The relay device is the relay device according to the foregoing aspects, and is configured to support the relay device in performing the method for sending a synchronization signal according to any one of the first aspect or the possible implementations of the first aspect, and/or the network device is the network device according to the foregoing aspects, and is configured to support the network device in performing the method for sending a synchronization signal according to any one of the second aspect or the possible implementations of the second aspect.

According to another aspect of this application, an apparatus is provided. The apparatus is a processor, an integrated circuit, or a chip, and is configured to perform the steps performed by the processor of the relay node in the embodiments of the present invention, for example, obtain synchronization signal information sent by a parent node, generate a synchronization signal based on the synchronization signal information, and output the synchronization signal. Content of the synchronization signal information and manners of sending and obtaining the synchronization signal information have been described in the foregoing other aspects or embodiments, and details are not described herein again.

According to another aspect of this application, another apparatus is provided. The apparatus is a processor, an integrated circuit, or a chip, and is configured to perform the steps performed by the processor of the network device in the embodiments of the present invention, to generate and output synchronization signal information of a relay node. Content of the synchronization signal information and manners of sending and obtaining the synchronization signal information have been described in the foregoing other aspects or embodiments, and details are not described herein again. In a possible implementation, the apparatus is further configured to obtain a synchronization signal information request sent by the relay node, where the synchronization signal information request is used to request the network device to send the synchronization signal information of the relay device to the relay device, and the apparatus is configured to generate and output the synchronization signal information of the relay device based on the synchronization signal information request.

It may be understood that the apparatus, the computer storage medium, or the computer program product of any method provided above are used to perform corresponding method provided above. Therefore, for beneficial effects that can be achieved by the apparatus, the computer storage medium, or the computer program product, refer to the beneficial effects of the corresponding method provided above, and details are not described herein again.

BRIEF DESCRIPTION OF THE DRAWINGS

FIG. 1-2 and FIG. 1-3 respectively show a user plane protocol stack structure and a control plane protocol stack structure of a layer 2 relay system according to an embodiment of this application;

FIG. 1-4 and FIG. 1-5 respectively show a user plane protocol stack structure and a control plane protocol stack structure of a layer 3 relay system according to an embodiment of this application;

FIG. 2-1 and FIG. 2-2 each are an example of symbol positions of SS/PBCH blocks in a radio frame according to an embodiment of this application;

FIG. 3 is a flowchart of a process in which a relay node obtains and sends synchronization signal information according to an embodiment of this application;

FIG. 4 is a flowchart in which a relay node obtains synchronization signal information from a donor node according to an embodiment of this application;

FIG. 5 is a flowchart in which a donor node configures synchronization signal information for a relay node according to an embodiment of this application;

DETAILED DESCRIPTION OF ILLUSTRATIVE EMBODIMENTS

The technical solutions of the embodiments of the present invention are described below with reference to the accompanying drawings. It is clear that the described embodiments are merely some rather than all of the embodiments of the present invention. All other embodiments obtained by a person of ordinary skill in the art based on the embodiments of the present invention without creative efforts shall fall within the protection scope of the present invention It should be understood that names of all nodes and messages in this application are merely names set for ease of description in this application, and may be different in an actual network. It should not be understood that the names of all the nodes and the messages are limited in this application, any name that has a function the same as or similar to that of the node or the message used in this application is considered as a method or equivalent replacement in this application, and falls within the protection scope of this application. Details are not described below again.

In consideration of a high bandwidth of a future wireless network, an integrated access and backhaul (JAB) solution is considered to be introduced in NR to further reduce deployment costs and improve deployment flexibility. Therefore, a relay with integrated access and backhaul is introduced. In this application, a relay node with integrated access and backhaul is referred to as a relay transmission reception point (rTRP), to be distinguished from a relay in LTE. The 3rd generation partnership project (3GPP) has determined to use NR JAB as a standardization target of Release 16, and the NR JAB is currently in a research start phase.

In addition, a solution in which a base station sends a synchronization signal in NR has been determined in a standard. A difference between the solution and a synchronization signal transmission manner in LTE is that because of introduction of a high frequency band in NR, transmission of a synchronization signal through an air interface is based on a synchronization signal/physical broadcast channel block (SS/PBCH block). In addition, a plurality of waveform parameters (Numerologies) are introduced in NR, and a symbol position occupied for transmission of a synchronization signal in a radio frame is related to the numerology. The numerology is a physical layer waveform parameter, and includes configurations of a subcarrier spacing (SCS) and a cyclic prefix (CP).

Because synchronization signals in NR and LTE are different, in an NR JAB system, to ensure that a relay node obtains a configuration of a synchronization signal parameter and sends a synchronization signal through an air interface is a problem that needs to be resolved.

Figure 1:
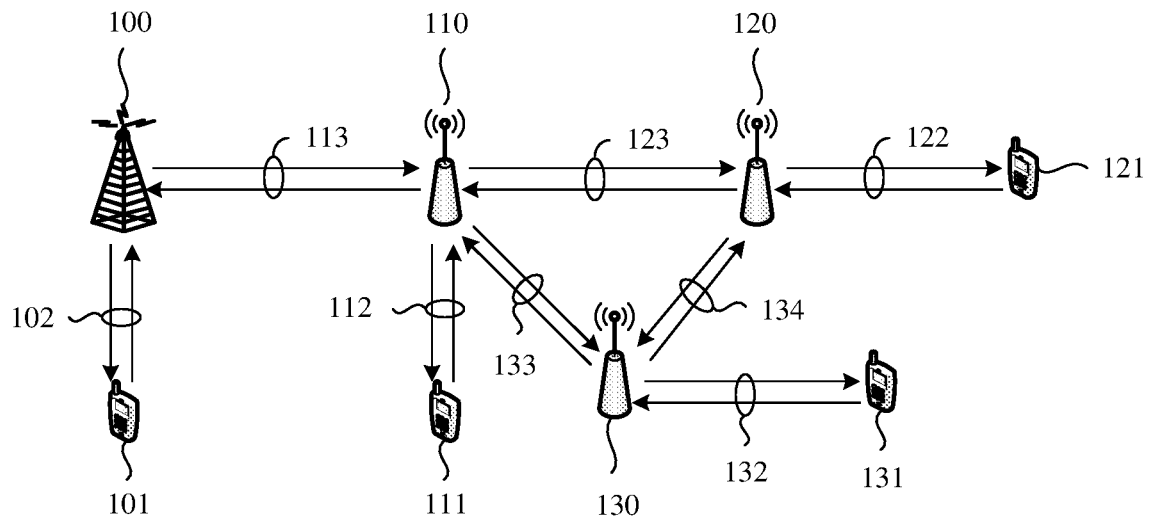
FIG. 1-1 shows an IAB communications system according to an embodiment of this application.

FIG. 1-1 is a schematic structural diagram of a communications system to which an embodiment of this application is applicable.

It should be noted that the communications system mentioned in the embodiments of this application includes but is not limited to a narrowband internet of things (NB-IoT) system, a long term evolution (LTE) system, a next-generation 5G mobile communications system, a communications system after 5G, or a device-to-device (D2D) communications system.

In the communications system shown in FIG. 1-1, an integrated access and backhaul JAB system is provided. One IAB system includes at least one base station 100, one or more user equipments (UE) 101 served by the base station 100, one or more relay nodes rTRPs 110, and one or more UEs 111 served by the rTRP 110. Usually, the base station 100 is referred to as a donor next generation NodeB (DgNB). The rTRP 110 is connected to the base station 100 through a wireless backhaul link 113. In this application, the donor next generation NodeB is also referred to as a donor node. The donor next generation NodeB includes but is not limited to: an evolved NodeB (eNB), a radio network controller (RNC), a NodeB (NodeB, NB), a base station controller (BSC), a base transceiver station (BTS), a home NodeB (for example, a home evolved NodeB or, HNB), a baseband unit (BBU), a next-generation new radio (NR, New Radio) base station (for example, a next generation NodeB (gNB)), and the like.

The integrated access and backhaul system may further include a plurality of other relay nodes, such as an rTRP 120 and an rTRP 130. The rTRP 120 is connected to the relay node rTRP 110 through a wireless backhaul link 123 to access a network, and the rTRP 130 is connected to the relay node rTRP 110 through a wireless backhaul link 133 to access the network. The rTRP 120 serves one or more UEs 121, and the rTRP 130 serves one or more UEs 131. In FIG. 1-1, both the relay nodes rTRP 110 and rTRP 120 are connected to the network through the wireless backhaul links. In this application, the wireless backhaul link is viewed from a perspective of the relay node. For example, the wireless backhaul link 113 is a backhaul link of the relay node rTRP 110, and the wireless backhaul link 123 is a backhaul link of the relay node rTRP 120. As shown in FIG. 1-1, one relay node, for example, the relay node 120, may be connected to another relay node, for example, the relay node 110 through a wireless backhaul link, for example, the wireless backhaul link 123, to access the network. In addition, the relay node may access the network through a plurality of levels of wireless relay nodes. Usually, a node, for example, the relay node 110, that provides a wireless backhaul link resource is referred to as a parent node of the relay node 120, and the relay node 120 is referred to as a child node of the relay node 110. Usually, a child node may be considered as user equipment UE of a parent node. It should be understood that, in the integrated access and backhaul system shown in FIG. 1-1, one relay node is connected to one parent node. However, in a future relay system, to improve reliability of a wireless backhaul link, a plurality of parent nodes may simultaneously serve one relay node, for example, the relay node 120. For example, the rTRP 130 may alternatively be connected to the relay node rTRP 120 through a backhaul link 134. That is, both the rTRP 110 and the rTRP 120 are parent nodes of the rTRP 130. In this application, the user equipments UEs 101, 111, 121, and 131 may be static or mobile devices. For example, the mobile device may be a mobile phone, an intelligent terminal, a tablet computer, a notebook computer, a video game console, a multimedia player, or even a mobile relay node. A static device, such as a computer or an access point (such as a static relay node, which is connected to a network through a wireless link) is usually located at a fixed position. Names of the relay nodes rTRPs 110, 120, and 130 do not limit a scenario or a network in which the relay nodes rTRPs 110, 120, and 130 are deployed, and the relay nodes may have any other names, such as relays or RNs. In this application, the rTRP is merely used for ease of description.

In FIG. 1-1, wireless links 102, 112, 122, 132, 113, 123, 133, and 134 may be bidirectional links, including uplink and downlink transmission links. In particular, wireless backhaul links 113, 123, 133, and 134 may be used by a parent node to provide a service for a child node, for example, used by a parent node 100 to provide a wireless backhaul service for a child node 110. It should be understood that an uplink and a downlink of the backhaul link may be separated, to be specific, data or signals of the uplink and the downlink are not transmitted by using a same node. Downlink transmission means that a parent node, for example, the node 100, transmits information or data to a child node, for example, the node 110. Uplink transmission means that a child node, for example, the node 110 transmits information or data to a parent node, for example, the node 100. The node is not limited to a network node or UE. For example, in a D2D scenario, the UE may act as a relay node to serve another UE. In some scenarios, the wireless backhaul link may also be an access link. For example, the backhaul link 123 may also be considered as an access link for the node 110, and the backhaul link 113 is also an access link for the node 100. It should be understood that the parent node may be a base station, or may be a relay node, and the child node may be a relay node, or may be UE having a relay function. For example, in a D2D scenario, the child node may alternatively be UE.

The relay node, such as the relay node 110, 120, or 130, shown in FIG. 1-1 may have two existence forms. One form is that the relay node exists as an independent access node and may independently manage UE accessing the relay node. In this case, the relay node usually has an independent physical cell identifier (PCI). A relay in this form usually needs to have a complete protocol stack function, for example, a radio resource control (RRC) function. This relay is usually referred to as a layer 3 relay. However, the relay node in the other form has no independent PCI, and belongs to a same cell as a donor node such as a donor eNB or a donor gNB, and does not manage any user. Protocol stacks of a layer 2 relay and a layer 3 relay are shown in FIG. 1-2 to FIG. 1-5. The donor node is a node though which any node can access a core network, or is an anchor base station, of a radio access network, by using which any node can access the network. The anchor base station is responsible for data processing at a packet data convergence protocol (PDCP) layer, or is responsible for receiving data of a core network and forwarding the data to a relay node, or receiving data of a relay node and forwarding the data to a core network.

Figures 1, 2:
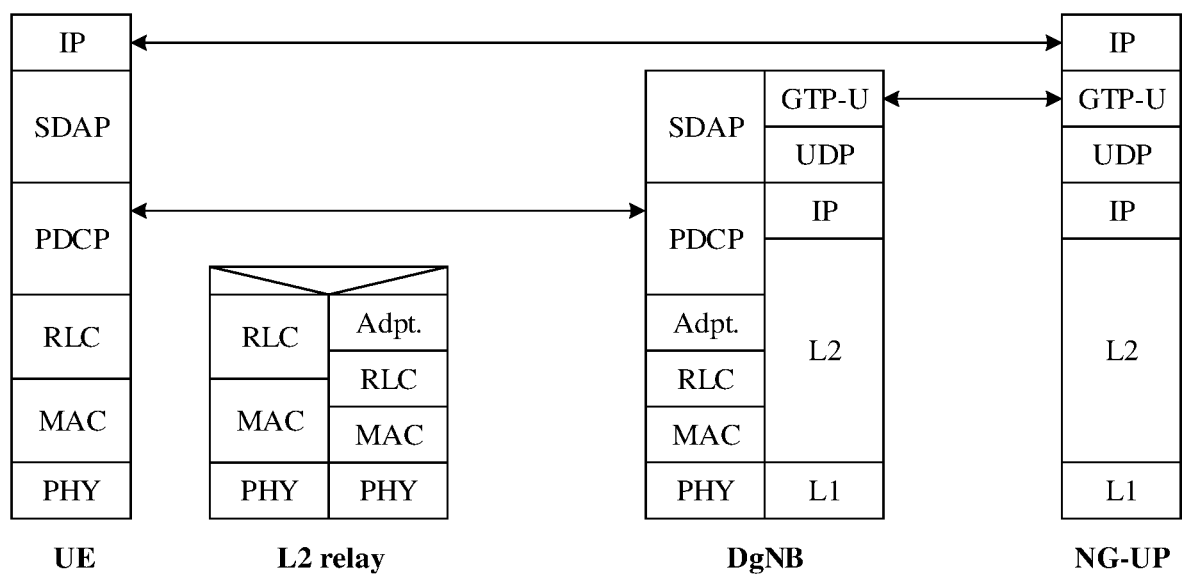
Figures 1, 2, 3:
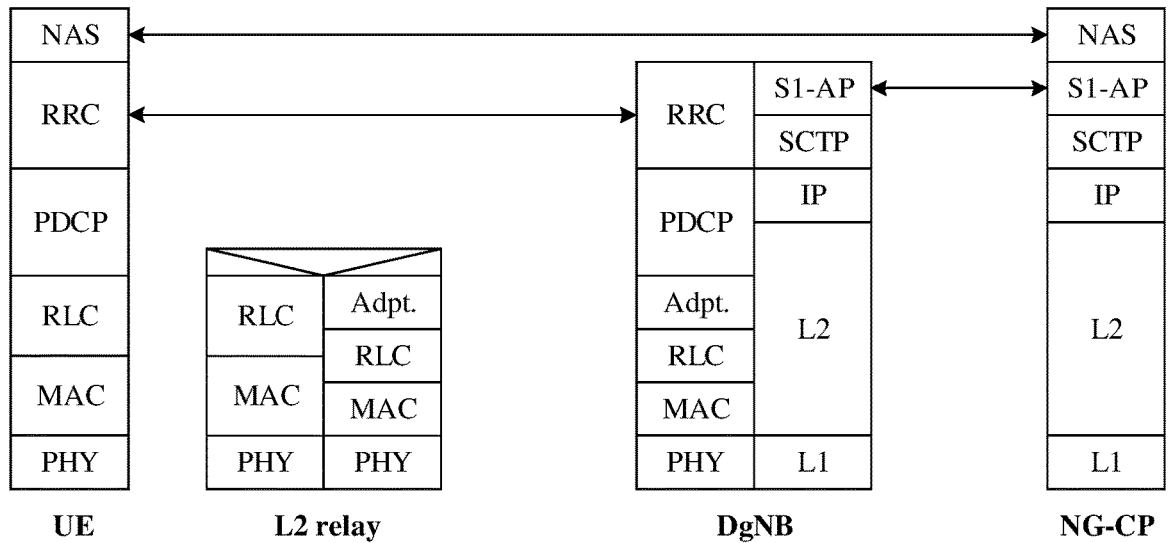

FIG. 1-2 and FIG. 1-3 are respectively diagrams of protocol architectures of a user plane protocol stack and a control plane protocol stack of a layer 2 relay system. In the figures, a next generation user plane (NG-UP) is mainly a user plane gateway, and a next generation control plane (NG-CP) is a control plane node. A protocol layer of a user plane of UE includes a physical layer (PHY), a medium access control (Medium Access Control, MAC) layer, a radio link control (RLC) layer, a PDCP layer, a service data adaptation protocol (SDAP) layer, and an internet protocol (IP) layer. The SDAP layer mainly provides a service adaptation function, including a quality of service (QoS) management function and a flow management function. A protocol layer of an air interface for communication between a layer 2 relay and the UE mainly includes a PHY layer, a MAC layer, and an RLC layer, and a protocol stack of an interface for communication between the layer 2 relay and a donor node through a backhaul link includes a PHY layer, a MAC layer, an RLC layer, and an adaptation (Adpt.) layer. The adaptation layer mainly provides a function including bearer management and security management. Correspondingly, a protocol stack of an interface between the donor node, namely, a DgNB, and the layer 2 relay includes a PHY layer, a MAC layer, an RLC layer, an Adpt. layer, a PDCP layer, and an SDAP layer. The DgNB and the NG-UP are usually connected in a wired manner, and a service bearer is usually established over a tunnel. A protocol stack of the DgNB corresponding to the NG-UP includes an L1 (Layer 1, L1), an L2 (Layer 2, L2), an IP layer, a user datagram protocol layer (User Datagram Protocol, UDP), and a general packet radio service tunneling protocol user plane (GTP-U) layer. Correspondingly, a protocol stack of the NG-UP includes an L1, an L2, an IP layer, a UDP layer, a GTP-U layer, and an IP layer. The foregoing protocol layers and functions thereof are well known by a person of ordinary skill in the art, and details are not described.

Similarly, FIG. 1-3 shows a control plane protocol stack structure of the layer 2 relay system. A protocol stack of the UE includes a PHY layer, a MAC layer, an RLC layer, a PDCP layer, an RRC layer, and a non-access stratum (NAS). A control plane protocol stack and a user plane protocol stack of a layer 2 relay are the same, and details are not described again. A protocol stack of a control plane interface between the DgNB and the layer 2 relay includes a PHY layer, a MAC layer, an RLC layer, an Adpt. layer, a PDCP layer, and an RRC layer. The DgNB is usually connected to a core network control plane network element NG-CP in a wired manner. A protocol stack of the DgNB on the interface includes an L1, an L2, an IP layer, a stream control transmission protocol (SCTP) layer, and an S1 application protocol (S1-AP) layer, where S1 is a code number of the interface. Correspondingly, a protocol stack of the NG-CP on the S1 interface includes an L1, an L2, an IP layer, an SCTP layer, an S1-AP layer, and an NAS, where the NAS corresponds to the NAS of the UE.

Similarly, FIG. 1-4 and FIG. 1-5 respectively show a user plane protocol stack structure and a control plane protocol stack structure of a layer 3 relay system. It is different from the user plane protocol stack of the layer 2 relay system that, a layer 3 relay and UE support a complete air interface protocol stack on an air interface, and the protocol stack includes: a PHY layer, a MAC layer, an RLC layer, a PDCP layer, and an SDAP layer. On an interface between the relay and a DgNB, a protocol stack of a relay node includes a PHY layer, a MAC layer, an RLC layer, a PDCP layer, an IP layer, a UDP layer, and a GTP-U layer. Correspondingly, a protocol stack of an S1 interface of the DgNB includes a PHY layer, a MAC layer, an RLC layer, a PDCP layer, an IP layer, a UDP layer, and a GTP-U layer. Other protocol layers are the same as those of the user plane protocol stack structure of the layer 2 relay system, and details are not described again.

FIG. 1-5 shows the control plane protocol stack structure of the layer 3 relay system. It is different from the control plane protocol stack of the layer 2 relay system that, in the control plane protocol stack structure of the layer 3 relay system, the layer 3 relay and the UE support a complete control plane protocol stack on an air interface, and the protocol stack includes a PHY layer, a MAC layer, an RLC layer, a PDCP layer, and an RRC layer. A protocol stack of an interface between the layer 3 relay and the DgNB includes a PHY layer, a MAC layer, an RLC layer, a PDCP layer, an IP layer, an SCTP layer, and an S1-AP layer. Correspondingly, a protocol stack of an interface between the DgNB and the layer 3 relay interface includes a PHY layer, a MAC layer, an RLC layer, a PDCP layer, an IP layer, an SCTP layer, and an S1-AP layer. Other protocol layers are the same as those of the control plane protocol stack structure of the layer 2 relay system, and details are not described again.

To correctly provide a service, a relay node in either of the foregoing forms needs to send a synchronization signal to UE or a device served by the relay node. However, as described above, a synchronization signal in NR is different from that in LTE, the synchronization signal in NR includes not only a synchronization signal sequence, but also a resource used when a synchronization signal SS/PBCH block is sent in a radio frame. Generation of the synchronization signal sequence mainly depends on a PCI. A primary synchronization signal (PSS) sequence and a secondary synchronization signal (SSS) sequence may be generated by using the PCI. FIG. 2-1 and FIG. 2-2 each are an example of symbol positions of SS/PBCH blocks in a radio frame according to an embodiment of this application. FIG. 2-1 is a symbol position diagram of SS/PBCH blocks having a subcarrier spacing of 15 kHz (Kilohertz) and a subcarrier spacing of 30 kHz in time domain. FIG. 2-2 is a symbol position diagram of SS/PBCH blocks having a subcarrier spacing of 120 kHz and a subcarrier spacing of 240 kHz in time domain. FIG. 2-1 is a time domain symbol position diagram of SS/PBCH blocks within 1 ms. FIG. 2-2 is a time domain symbol position diagram of SS/PBCH blocks within 0.25 ms. 211 and 221 in FIG. 2-1 respectively represent one symbol of the subcarrier spacing of 15 kHz and one symbol of the subcarrier spacing of 30 kHz. For the subcarrier spacing of 15 kHz, 1 ms includes 14 symbols. For the subcarrier spacing of 30 kHz, 1 ms includes 28 symbols. Regardless of a subcarrier spacing, one slot includes 14 symbols. Therefore, for the subcarrier spacing of 15 kHz, 1 ms is one slot, and for the subcarrier spacing of 30 kHz, 1 ms includes two slots. To be specific, in FIG. 2-1, symbols 0 to 13 are one slot, and symbols 14 to 27 are the other slot. Similarly, for the subcarrier spacing of 120 kHz, 0.125 ms includes two slots, and for the subcarrier spacing of 240 kHz, 0.125 ms includes four slots. For the subcarrier spacing of 15 kHz, 1 ms includes two SS/PBCH blocks, namely, 212 and 213, and start positions of symbol bits are respectively 2 and 8. For the subcarrier spacing of 30 kHz, there are two SS/PBCH block modes. One mode is that start positions of symbol bits of SS/PBCH blocks are respectively {4, 8, 16, 20}, and four different SS/PBCH blocks are respectively 222, 223, 224, and 225. The other mode is that start positions of symbol bits of SS/PBCH blocks are respectively {2, 8, 16, 22}, and four different SS/PBCH blocks are respectively 226, 227, 228, and 229. Similarly, for the subcarrier spacing of 120 kHz, start positions of symbol bits of SS/PBCH blocks are respectively {4, 8, 16, 20}, and four different SS/PBCH blocks are respectively 232, 233, 234, and 235. For the subcarrier spacing of 240 kHz, start positions of symbol bits of SS/PBCH blocks are respectively {8, 12, 16, 20, 32, 36, 40, 44}, and eight different SS/PBCH blocks are respectively 242, 243, 244, 245, 246, 247, 248, and 249. Each SS/PBCH block occupies four symbol bits in time domain. Currently, a quantity L of SS/PBCH blocks defined in NR may be 4, 8, or 64. For different subcarrier spacings, values of L are different. For the subcarrier spacing of 15 kHz and the subcarrier spacing of 30 kHz, a maximum value of L is 8. For the subcarrier spacing of 120 kHz and the subcarrier spacing of 240 kHz, a maximum value of L is 64. For the subcarrier spacing of 15 kHz and the subcarrier spacing of 30 kHz, a maximum value of L is 4 for a frequency band less than 3 GHz (Giga Herz, GHz), a maximum value of L is 8 for a frequency band greater than 3 GHz to 6 GHz. A maximum value of L is 64 for a frequency band greater than 6 GHz. Therefore, the value of L may be determined by using the frequency band.

FIG. 2-1 shows the SS/PBCH blocks within 1 ms when the subcarrier spacing is 15 kHz and the SS/PBCH blocks within 1 ms when the subcarrier spacing is 30 kHz. FIG. 2-2 shows the SS/PBCH blocks within 0.125 ms when the subcarrier spacing is 120 kHz and the SS/PBCH blocks within 0.125 ms when the subcarrier spacing is 240 kHz. When L is greater than the quantity of SS/PBCH blocks shown in FIG. 2-1 and FIG. 2-2, an SS/PBCH block continues to be sent in the same mode in a subsequent slot. A method is as follows:

For the subcarrier spacing of 15 kHz, the SS/PBCH block is sent according to $\{2, 8\}+14*n$, where $\{2, 8\}$ indicates an index, namely, a position, of the first symbol of the SS/PBCH block. The rest can be deduced by analogy, and details are not described again. For a frequency band less than or equal to 3 GHz, n=0 or 1. For a frequency band greater than 3 GHz and less than or equal to 6 GHz, n=0, 1, 2, or 3. A position of an SS/PBCH block within a synchronization signal periodicity traverses the foregoing values of n by using the foregoing formula. The rest can be deduced by analogy, and details are not described again.

For the subcarrier spacing of 30 kHz, the SS/PBCH block is sent according to $\{4, 8, 16, 20\}+28*n$. For a frequency band less than or equal to 3 GHz, n=0. For a frequency band greater than 3 GHz and less than or equal to 6 GHz, n=0 or 1.

For the subcarrier spacing of 30 kHz, the SS/PBCH block is sent according to $\{2, 8\}+14*n$. For a frequency band less than 3 GHz or equal to 3 GHz, n=0 or 1. For a frequency band greater than 3 GHz and less than or equal to 6 GHz, n=0, 1, 2, or 3.

For the subcarrier spacing of 120 kHz, the SS/PBCH block is sent according to $\{4, 8, 16, 20\}+28*n$. For a frequency band greater than 6 GHz, n=0, 1, 2, 3, 5, 6, 7, 8, 10, 11, 12, 13, 15, 16, 17, or 18.

For the subcarrier spacing of 240 kHz, the SS/PBCH block is sent according to $\{8, 12, 16, 20, 32, 36, 40, 44\}+56*n$. For a frequency band greater than 6 GHz, n=0, 1, 2, 3, 5, 6, 7, 8, 10, 11, 12, 13, 15, 16, 17, or 18.

The start position of the SS/PBCH block in time domain is mainly described above. As described above, one SS/PBCH block occupies four symbols. In NR, it is specified that a PSS occupies a zeroth symbol bit (where symbols are numbered from 0 to 3), an SSS occupies a second symbol bit, and a PBCH occupies a second symbol bit and a third symbol bit. In addition, the SS/PBCH block occupies 240 consecutive subcarriers (numbered from 0 to 239) in frequency domain, the PSS occupies subcarriers 56 to 182 at the zeroth symbol bit, and subcarriers 0 to 55 and 183 to 239 are set to 0. The SSS occupies subcarriers 56 to 182 at the second symbol bit, and subcarriers 48 to 55 and 183 to 191 are set to 0. Subcarriers 0 to 47 and 192 to 239 at the second symbol bit, and subcarriers 0 to 239 at the first symbol bit and the third symbol bit are used for PBCH transmission.

In addition to the time domain configuration of the SS/PBCH block, a position of a frequency domain resource further needs to be determined for sending a synchronization signal. Therefore, synchronization signal information further includes information about a bandwidth part (BWP) corresponding to the synchronization signal information, and the relay node sends the synchronization signal in the bandwidth part based on the information about the bandwidth part corresponding to the synchronization signal information. In NR, one or more BWPs may be supported. If there are a plurality of BWPs, and the synchronization signal can be transmitted in different BWPs, information about the BWPs needs to be specified.

In addition, the synchronization signal further includes information about a PBCH. The information about the PBCH mainly includes at least one of the following information: an index explicit indication (ssb-IndexExplicit), a half-frame index (halfFrameIndex), a system frame number (systemFrameNumber), a common subcarrier spacing (subCarrierSpacingCommon), a subcarrier offset (ssb-subcarrierOffset), a demodulation reference signal (Demodulation Reference Signal, DMRS) type A position (dmrs-TypeAPosition), a SIB 1 PDCCH configuration (pdcchConfigSIB1), cell barring (cellBarred), and intra-frequency cell reselection (intraFreqReselection). For a specific meaning of each PBCH field, refer to the 3GPP 38.331 protocol, and the specific meaning should be understood by a person of ordinary skill. Details are not described.

Based on the foregoing manner of sending the SS/PBCH block, a relay node receives the synchronization signal information sent by a parent node through an air interface, and the synchronization signal information includes at least one of the following information: a subcarrier spacing of the synchronization signal, information about an operating frequency band of the relay node, information about a PBCH, a synchronization signal periodicity, and indication information of a synchronization signal obtaining manner. The relay node sends the synchronization signal based on the synchronization signal information. The synchronization signal information further includes a physical cell identifier (PCI), and the PCI is used to generate a synchronization signal sequence, and the synchronization signal sequence is transmitted on a synchronization signal resource.

The information about the operating frequency band of the relay node refers to an operating frequency range of a communications device. For frequency division duplex (FDD), the information includes an uplink frequency band and a downlink frequency band. The communication device includes but is not limited to a base station, a relay node, and a terminal. Usually, the information about the operating frequency band of the relay node is indicated by using a number. For example, two time division duplex (TDD) frequency bands are defined in the 3GPP 38.813 protocol: n77 and n78. An uplink (UL) frequency range corresponding to n77 is 3300 MHz to 4200 MHz, and a downlink (DL) frequency range corresponding to n77 is 3300 MHz to 4200 MHz. A UL frequency range corresponding to n78 is 3300 MHz to 3800 MHz, and a DL frequency range corresponding to n78 is 3300 MHz to 3800 MHz. It should be understood that this is merely an example, and a relay in NR can operate in any specified frequency band. The information about the operating frequency band of the relay node may be indicated by using a frequency band number, or may be indicated in another manner. For example, an operating frequency range is provided. This is not limited in this embodiment. Any change or replacement readily figured out by a person of ordinary skill in the art shall fall within the technical scope disclosed in this embodiment. The synchronization signal information includes the information about the operating frequency band of the relay node, so that the relay node can determine a quantity of and positions of SS/PBCH blocks. For details, refer to the following embodiments.

The synchronization signal periodicity is an SS/PBCH block transmission periodicity in the foregoing different subcarrier spacings. SS/PBCH blocks transmitted in one SS/PBCH block periodicity are different. The different SS/PBCH blocks are 212 and 213, or 222, 223, 224, and 225, or the like shown in FIG. 2-1, and the like, which are not listed one by one herein. A person of ordinary skill in the art should understand that the SS/PBCH block periodicity refers to an interval of transmitting a group of SS/PBCH blocks through the air interface, and the group of SS/PBCH blocks belong to a same periodicity. The synchronization signal periodicity in NR is configurable. Therefore, the synchronization signal periodicity needs to be specified, so that the relay node can correctly configure the periodicity of sending the synchronization signal.

As described above, a relay includes a plurality of forms. For a layer 3 relay, there is an independent physical cell identifier PCI. For a relay without a physical cell identifier PCI, the relay may further be divided into a layer 2 relay and a layer 1 relay. Usually, the layer 1 relay mainly amplifies a signal, and does not perform upper-layer protocol processing, where an upper-layer protocol is a protocol at or above a MAC layer. In future NR, relays mainly include the layer 2 relay and the layer 3 relay, and the layer 2 relay has functions of a layer 2 protocol stack, including functions of MAC, RLC, and/or PDCP. Currently, in NR, to separate control and a bearer in terms of an architecture, RRC and PDCP functions are usually integrated together. Therefore, the layer 2 relay mainly includes MAC and RLC functions. It should be understood that this embodiment does not limit placement of the functions of the layer 2 protocol stack. In some scenarios, the MAC function, the RLC function, and the PDCP function may be included. In some scenarios, only the MAC function, the RLC function, and/or an adaptation layer function may be included. In some scenarios, the MAC function, the RLC function, and a part of the RRC function may be included. Even in some scenarios, the MAC function, the RLC function, the PDCP function, and a part of the RRC function are included. This is not limited in this embodiment.

When the relay node is the layer 3 relay, usually, because the PCI of the relay node is different from that of a donor node, the synchronization signal of the relay node is different from that of the donor node. When the relay node is the layer 2 relay, the synchronization signal of the relay node is the same as that of the donor node. It should be understood that, that the synchronization signal of the relay node is the same as that of the donor node herein means that a PSS, an SSS, and the PBCH of the synchronization signal are the same as those of the donor node, but periodicities of the donor node and the relay node may be configured to be different. This depends on specific implementation, and is not limited in this embodiment.

The indication information of the synchronization signal obtaining manner is mainly used in a scenario of the layer 2 relay. If only the donor node and the relay node can operate in a same carrier, and there is no other BWP, the synchronization signal of the relay node is completely the same as the synchronization signal of the donor node, and the relay node may obtain all synchronization signal information from the synchronization signal of the donor node. In this case, the indication information of the synchronization signal obtaining manner is used to indicate whether the synchronization signal information is configured by a network node, for example, the donor node, or is automatically obtained by the relay node from synchronization signal information of the donor node. It should be understood that if the synchronization signal information is explicitly configured, to be specific, the synchronization signal information is configured by the network node, the indication information of the synchronization signal obtaining manner may be unnecessary.

To enable the relay node to serve UE after the relay node is started, the relay node first needs to obtain correct synchronization signal information and sends the information through the air interface. The method is as follows: The relay node receives the synchronization signal information sent by the parent node through the air interface, and the synchronization signal information includes at least one of the following information: the subcarrier spacing of the synchronization signal, the information about the operating frequency band of the relay node, the information about the physical broadcast channel PBCH of the relay node, the synchronization signal periodicity, and the indication information of the synchronization signal obtaining manner. The relay node sends the synchronization signal based on the synchronization signal information.

The synchronization signal may include the synchronization signal sequence, the synchronization signal information may further include the physical cell identifier PCI, and the relay node generates the synchronization signal sequence based on the PCI. A specific synchronization signal sequence is generated by using a generator polynomial. This should be well known by a person of ordinary skill in the art, and details are not described.

In view of that NR supports the bandwidth part BWP, the synchronization signal information further includes the information about the bandwidth part BWP information corresponding to the synchronization signal information, and the relay node sends the synchronization signal in the bandwidth part BWP based on the information about the bandwidth part BWP corresponding to the synchronization signal.

Further, in view of that the synchronization signal in the NR is sent in a form of a beam, transmit powers for all beams may be the same or may be different. Therefore, the synchronization signal information further includes a transmit power corresponding to the synchronization signal, and the relay node sends the synchronization signal at the transmit power.

The relay node transmits the synchronization signal information through the air interface, so that deployment costs can be effectively reduced and fast deployment can be implemented. In addition, the synchronization signal in NR is different from that in LTE. The synchronization signal information is automatically obtained through the air interface, so that manual configuration can be avoided and configuration efficiency can be improved. In addition, because NR supports a bandwidth part BWP function, different relay nodes in a cell and the donor node may operate in a same BWP or different BWPs, to better adapt to service requirements at different positions in the cell. Therefore, the synchronization signal information of the relay node is configured through the air interface, so that this configuration manner has greater flexibility and a greater degree of freedom, to adapt to a requirement of a network service change.

FIG. 3 is a flowchart of a process in which a relay node obtains and sends synchronization signal information according to an embodiment of this application. Network elements included in FIG. 3 include base stations, such as an gNB (gNB), an access and mobility management function (AMF)/a session management function (Session Management Function, SMF), a user plane function (UPF), a unified data management (UDM)/an authentication server function (AUSF), an operation, administration and maintenance (OAM) node, and a donor node, that is, the donor node and neighboring base stations. It should be understood that names of the foregoing network elements do not limit the method in this embodiment. In some implementation, the AMF/SMF is also referred to as a mobility management entity (MME), the UPF is also referred to as a serving gateway (S-GW)/packet data network gateway (P-GW), and the UDM/AUSF is also referred to as a home subscriber server (HSS). Any change or replacement readily figured out by a person of ordinary skill in the art shall fall within the technical scope disclosed in this embodiment. Steps are as follows.

S301: Start the relay node, that is, power on and start the relay node.

S302: In a power-on process, the relay node performs an attach process as common UE, where the attach process includes an authentication process, and the authentication process is completed through interaction between the AMF/SMF and the UDM/AUSF. In the authentication process, the relay node is identified as the relay node. After the authentication succeeds, the relay node may be attached to a current base station and the network element AMF/SMF of a core network. The base station establishes a security connection to the OAM node based on an APN (APN) provided by the relay node. The attach process is defined in a standard, for example, 3GPP 23.501, and should be well known by a person of ordinary skill in the art. Details are not described.

S303: After the attach process is performed by the relay node serving as the UE and a bearer to the OAM node is established, the relay node may be connected to the OAM node by using a user plane gateway UPF, and the OAM node identifies an identifier of the relay node. After determining that the relay node is an authorized relay node, the OAM node provides an initial parameter for the relay node, where the initial parameter includes a donor node list.

S304: After the relay node obtains the initial parameter from the OAM node, because the base station currently accessed by the relay node may not be a base station in the donor node list, or the AMF/SMF selected by the currently accessed base station does not support access of the relay node, the relay node serves as the UE and performs a detach process to clear data in the currently accessed base station and the AMF/SMF, to complete a first phase process. That is, in the first phase, the relay node serves as the UE to access a parent node and obtain the initial parameter. The detach process is defined in a standard protocol, for example, the 3GPP 38.501 protocol, and should be well known by a person of ordinary skill in the art. Details are not described.

S305: After obtaining the donor node list, the relay node performs a second phase process. Because the relay node has obtained the donor node list, the relay node may serve as the UE and perform the attach process. In this process, the relay node accesses a donor node in the initial parameter in the first phase, and also performs the authentication process to the AMF/SMF and the UDM/AUSF. After the authentication succeeds, the donor node establishes a control plane bearer to the AMF/SMF for the relay node. The donor node establishes a user plane security channel connection to the OAM node for the relay node, so that the relay node can obtain configuration information from the OAM node.

S306: After the relay node is connected to the OAM node, the OAM node further configures the relay node. The OAM node configures information including synchronization signal information, a cell global identifier (CGI), and the like for the relay node, and sends the information to the relay node through an air interface of the donor node. The synchronization signal information is described above, and details are not described again. Names of the CGI in different systems may be different. For example, the CGI is also referred to as an evolved universal terrestrial radio access network (E-UTRAN) CGI (ECGI) in LTE. It should be understood that any change or replacement readily figured out by a person of ordinary skill in the art should fall within the technical scope disclosed in this embodiment. In this step, an OAM module of the relay node establishes the connection to the OAM node by using an IP address, and data, such as a configuration parameter, of the connection to the OAM node is transmitted over an IP layer.

If the synchronization signal information includes indication information of a synchronization signal obtaining manner, and the information indicates the relay node to obtain the synchronization signal information by using a synchronization signal of the donor node, the relay node generates a synchronization signal by using the synchronization signal information obtained from the donor node and sends the synchronization signal without needing to obtain the synchronization signal information from a network. In a subsequent embodiment, the synchronization signal information may include only the indication information of the synchronization signal obtaining manner, and the information indicates the relay node to obtain the synchronization signal information from the donor node. The synchronization signal information does not include a parameter of other synchronization signal information, and details are not described again.

It should be understood that step S306 should further include: sending, by the relay node, an acknowledgment message after the synchronization signal and the CGI information are received by the relay node. To be specific, the relay node sends the acknowledgment message to the network, indicating that the relay node receives the configuration information. The configuration information sent by the OAM node is application layer data above an IP layer, that is, the OAM node controls/configures data.

S307: The relay node sends the synchronization signal based on the synchronization signal information. UE served by the relay node may send the synchronization signal by using the relay node to select to camp on or access the relay node. If the synchronization signal information includes only the indication information of the synchronization signal obtaining manner, the relay node automatically obtains the synchronization signal information from the donor node, generates the synchronization signal of the relay node and information about a PBCH based on the obtained synchronization signal information, and sends the synchronization signal of the relay node and the information about the PBCH through the air interface.

It should be understood that, after step S306, the relay node may further initiate a process of establishing S1, a process of establishing X2, a process of updating a bearer configuration by the donor node, and a process of updating cell information by the donor node. The foregoing processes are not provided in FIG. 3, but the process of establishing the S1 and the process of establishing X2 exist, and details are not described again.

The OAM node in the foregoing figure is only a functional entity. In this embodiment, the OAM node is merely used as an example. In a future network, the function may be integrated into another node, for example, the AMF/SMF. This is not limited in this embodiment. It should be understood that the OAM node may alternatively be any other entity or module having a configuration function. Any change or replacement readily figured out by a person of ordinary skill in the art shall fall within the protection scope of this application.

In this embodiment, the relay node may obtain the synchronization signal information from the OAM node, to generate the synchronization signal based on the synchronization signal information and send the synchronization signal, thereby resolving a problem of configuring the synchronization signal information of the relay node. In this solution, the synchronization signal information is configured at one time by using the OAM node, thereby simplifying the implementation solution.

Figures 1, 2, 3, 4:
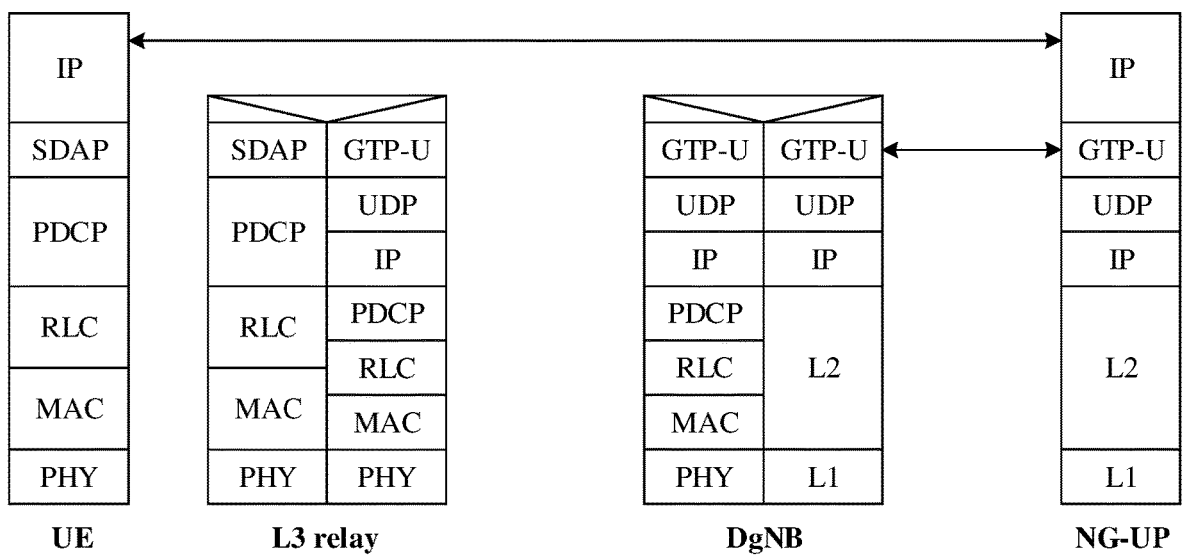

FIG. 4 is a flowchart in which a relay node obtains synchronization signal information from a donor node according to this application. In some scenarios, especially when the relay node is a layer 2 relay, synchronization signal information of the donor node does not need to be configured for the relay node by an OAM node, but is configured for the relay node by the donor node. It should be understood that the scenario herein is not limited to a case in which the relay node is the layer 2 relay. When the relay node is a layer 3 relay, the synchronization signal information of the donor node may also be sent to the relay node by the donor node. The method is as follows: A network node sends the synchronization signal information to the relay node through an air interface, where the synchronization signal information includes at least one of the following information: a subcarrier spacing of a synchronization signal, information about an operating frequency band of the relay node, information about a physical broadcast channel of the relay node, a synchronization signal periodicity, and indication information of a synchronization signal obtaining manner. The network node receives an acknowledgment message sent by the relay node. The method may further include: receiving, by the network node, a synchronization signal information configuration request sent by an operation, administration and maintenance node, where the synchronization signal information configuration request is used to indicate the network node to send the synchronization signal information to the relay node. Steps are as follows:

Step S401 to step S405 are the same as step S301 to step S305 in FIG. 3, and details are not described again.

S406: It is different from step S306 in FIG. 3 that, in this step, the OAM node configures only CGI for the relay node, and does not configure synchronization signal information. When the OAM node does not configure the synchronization signal information for the relay node, the OAM node may control the donor node to configure the synchronization signal information for the relay node, or the OAM node may control the relay node to actively request the donor node to configure the synchronization signal information, or the OAM node indicates the relay node to automatically obtain the synchronization signal information by reading an SS/PBCH block sent by the donor node. A configuration parameter sent by the OAM node may include indication information of a synchronization signal obtaining manner, and the indication information of the synchronization signal obtaining manner is used to indicate a manner of obtaining the synchronization signal information by the relay node. Specifically, the manner of obtaining the synchronization signal information may be: The OAM node configures the synchronization signal information (as the solution shown in FIG. 3), or the donor node configures the synchronization signal information for the relay node, or the relay node actively requests the synchronization signal information from the donor node, or the relay node automatically obtain the synchronization signal information by reading the SS/PBCH block sent by the donor node. When the synchronization signal information sent by the OAM node to the relay node already includes all information for sending a synchronization signal by the relay node, an indication of the obtaining manner is optional. Optionally, it may be determined, through protocol definition, that the synchronization signal information is obtained in one of the foregoing manners. In this case, the indication information of the synchronization signal obtaining manner is not required. The indication information of the synchronization signal obtaining manner may further include PCI or CGI information of the donor node. Herein, the indication information of the synchronization signal obtaining manner included by the OAM node in the configuration parameter is usually configured, in advance based on network planning and network optimization, by the OAM node in a system in which the OAM node is located, or may be configured in another manner. For example, the OAM node automatically determines the configuration parameter based on an attribute of the relay node. For example, the relay node is the layer 2 node or the layer 3 node. A specific manner is not limited in this application.

As described above, if the indication information of the synchronization signal obtaining manner in the configuration parameter sent by the OAM node indicates the relay node to automatically obtain the synchronization signal information by using the SS/PBCH block sent by the donor node, the relay node automatically reads the SS/PBCH block sent by the donor node, and obtains a parameter related to the synchronization signal information. In this case, the relay node skips step S407, and directly performs a synchronization signal sending process in step S408.

It should be understood that step S406 should further include: sending, by the relay node, an acknowledgment message after the synchronization signal and the CGI information are received by the relay node. To be specific, the relay node sends the acknowledgment message to the network, indicating that the relay node receives the configuration information. The configuration information sent by the OAM node is application layer data above an IP layer, that is, the OAM node controls/configures data.

S407: If the synchronization signal information of the relay node is not automatically obtained by the relay node by automatically reading the SS/PBCH block sent by the donor node, the OAM node may indicate the donor node to send the synchronization signal information to the relay node, or indicate the relay node to actively request the donor node to send the synchronization signal information. When the synchronization signal information of the relay node is obtained in any one of the foregoing manners, the relay node needs to interact with the donor node. In this case, the synchronization signal information may be encapsulated in an RRC message, for example, an RRC reconfiguration message, for sending.

If the OAM node indicates the donor node to send the synchronization signal information to the relay node, that the donor node is to send the synchronization signal information to the relay node may be indicated in the synchronization signal information sent to the relay node, or indicated through protocol definition. This is not limited in this application. In this case, the relay node does not need to actively request the donor node to send the synchronization signal information, and after receiving the configuration information sent by the OAM node, the relay node waits to receive the synchronization signal information sent by the donor node.

It should be understood that, the RRC reconfiguration message is merely used as an example above, and use of the RRC reconfiguration message is not limited. An RRC connection reconfiguration message or another RRC configuration message may alternatively be used. In this application, a specific message name is merely used as an example, and use of the specific message is not limited. Any change in or replacement on an RRC message that can be easily figured out by a person skilled in the art falls within the protection scope of this application. The following examples of RRC messages are also examples of specific message names, and details are not described again.

It should be understood that step S407 herein includes either of the foregoing two solutions. To be specific, the donor node actively configures the synchronization signal information for the relay node, or the relay node actively requests the donor node to send the synchronization signal information. When the OAM node configures the relay node to automatically obtain the synchronization signal information from the SS/PBCH block sent by the donor node, step S407 is not performed.

It should be understood that, after step S407, the relay node may further initiate a process of establishing S1, a process of establishing X2, a process of updating a bearer configuration by the donor node, and a process of updating cell information by the donor node. The foregoing processes are not provided in FIG. 3, but the process of establishing the S1 and the process of establishing X2 exist, and details are not described again.

According to the foregoing solution, the relay node may obtain the synchronization signal information from the donor node, so that a configuration procedure is simplified, and configuration efficiency is improved, thereby quickly obtaining the synchronization signal information.

Figures 1, 2, 3, 4, 5:
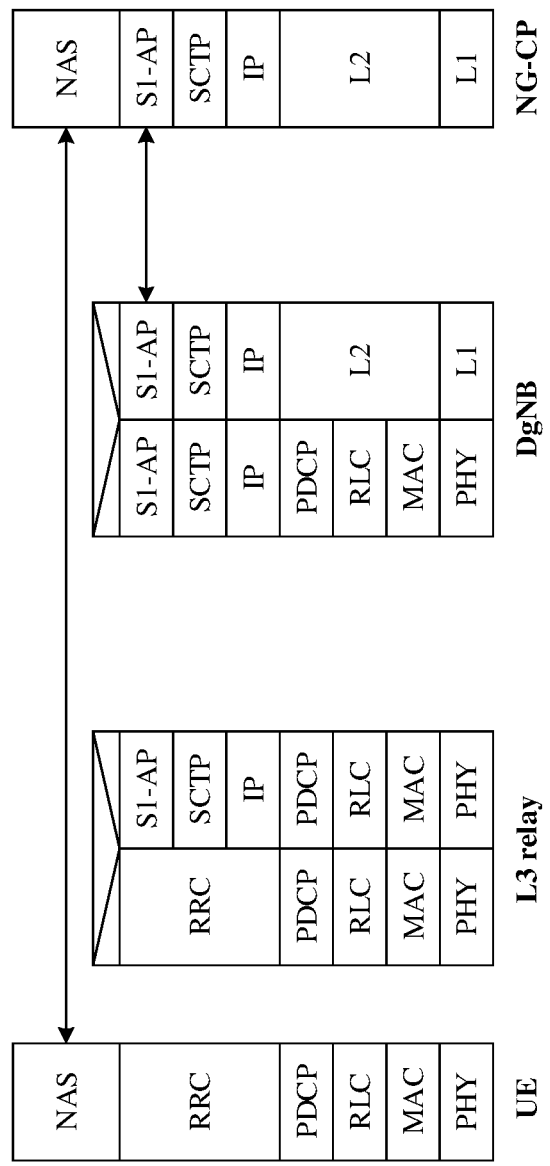
Figures 1, 2:
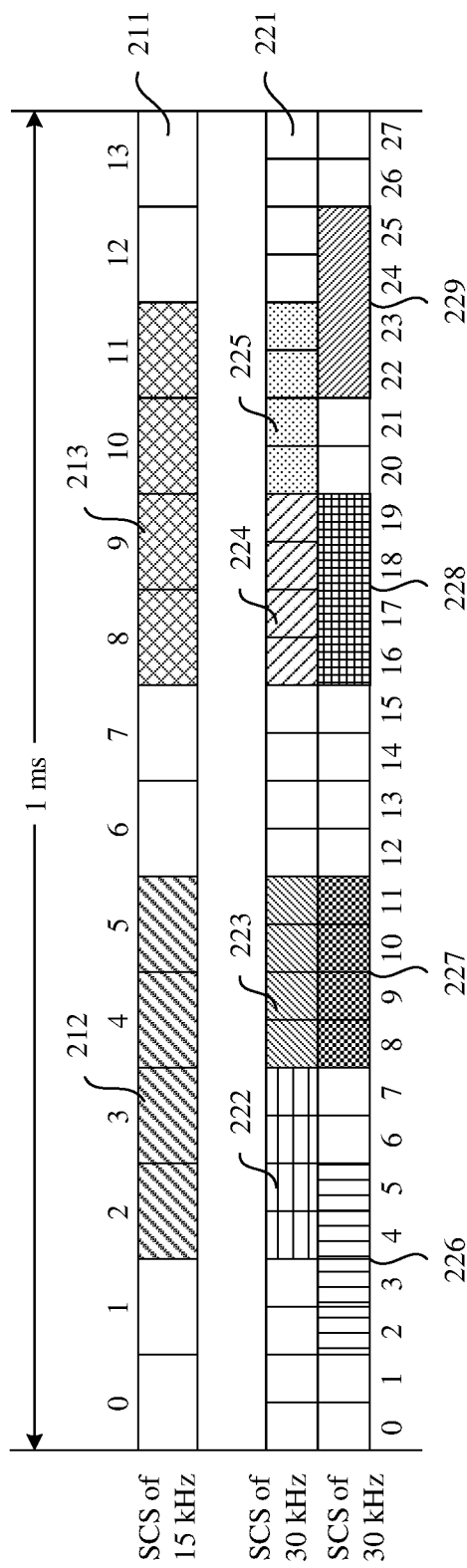
Figure 2:
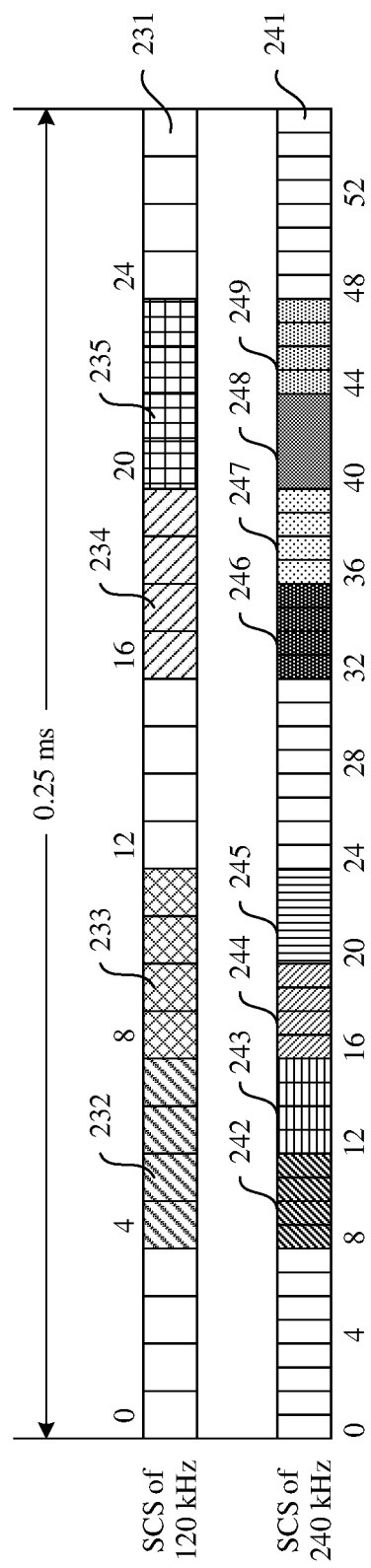
Figure 3:
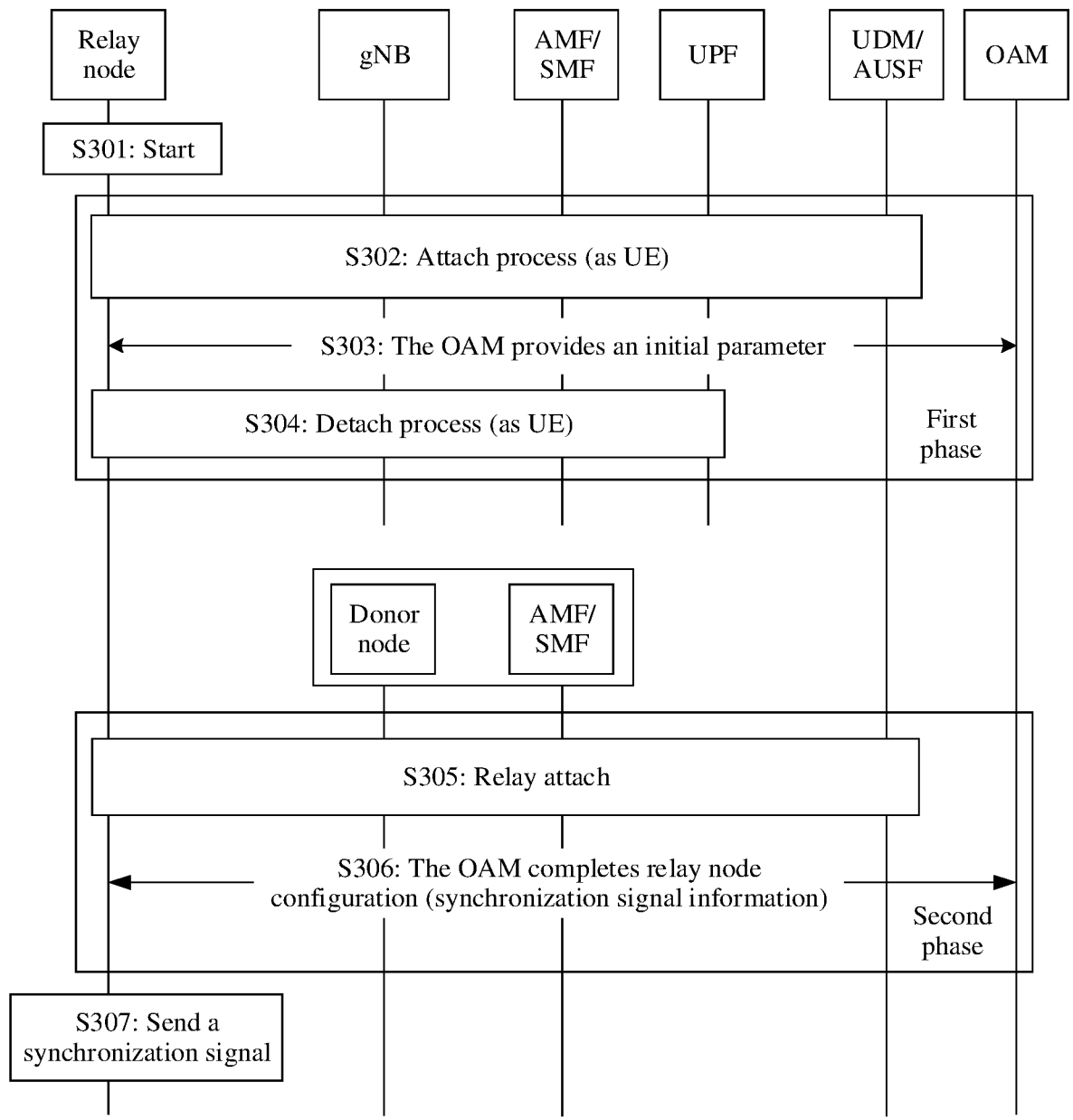
Figure 4:
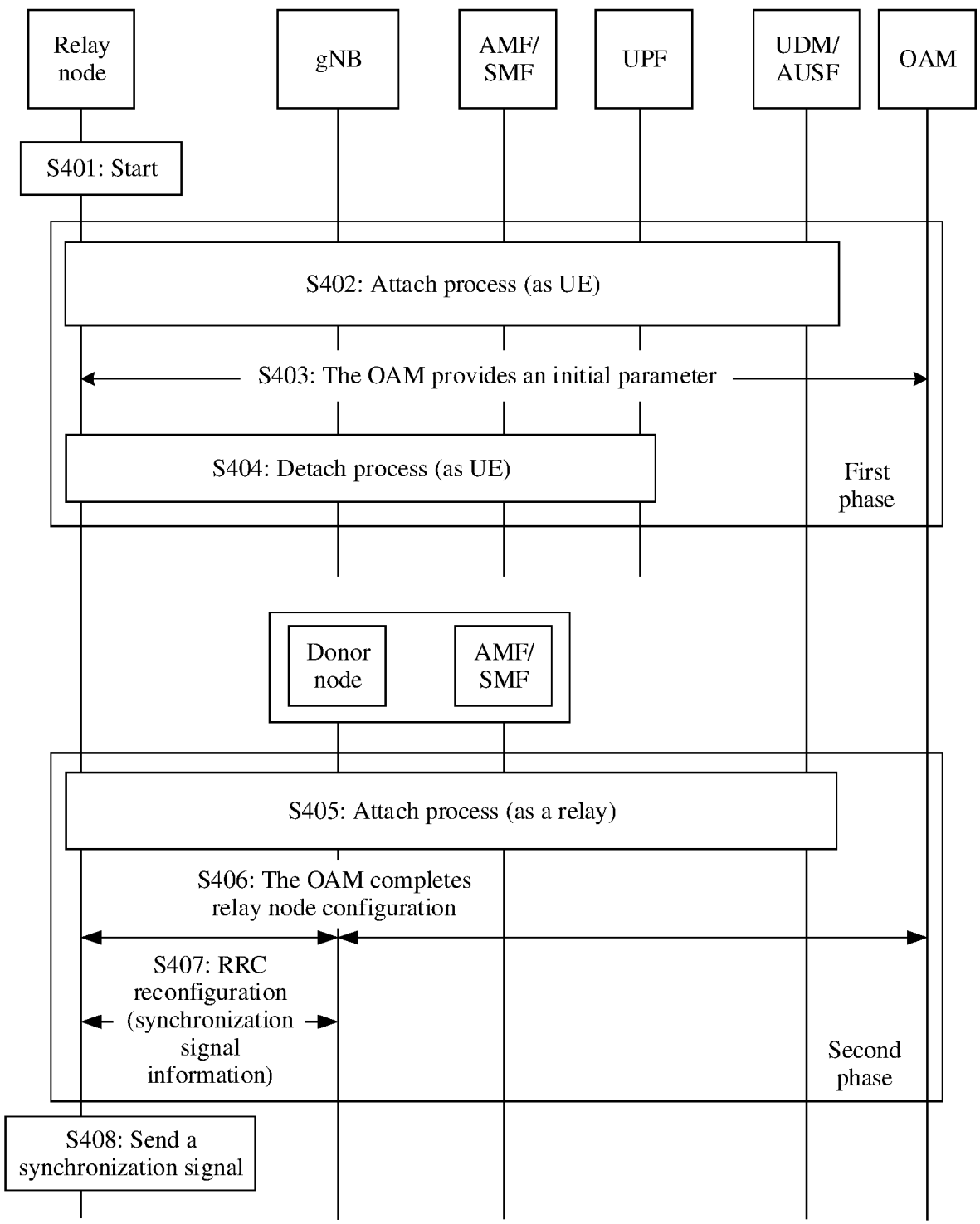
Figure 5:
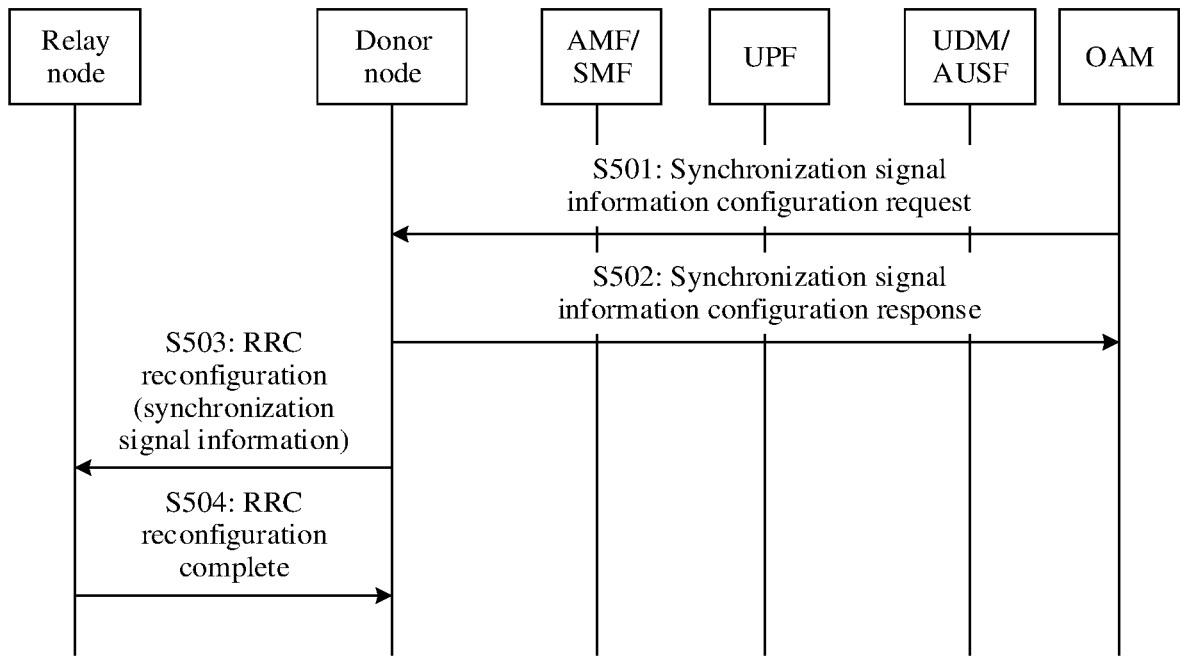

In an optional solution, as described in the foregoing embodiment, the OAM node may configure the synchronization signal information for the relay node in a plurality of manners. Step S406 and step S407 in FIG. 4 are different based on different synchronization signal information configuration manners. A manner in which the OAM node indicates the relay node to automatically obtain the synchronization signal information by sending the SS/PBCH block by the donor node is described above. The following embodiment is only used for an implementation method in which the OAM node indicates the donor node to configure the synchronization signal information for the relay node, or indicates the relay node to actively request the donor node to send the synchronization signal information. FIG. 5 is a flowchart in which a donor node configures synchronization signal information for a relay node according to an embodiment of this application. Specifically, an OAM node requests the donor node to configure the synchronization signal information for the relay node. After receiving the request from the OAM node, the donor node sends the synchronization signal information to the relay node through an air interface. Steps are as follows:

S501: The OAM node sends a synchronization signal configuration request to the donor node, where the synchronization signal configuration request includes an identifier of the relay node, and the identifier may be an IP address, a CGI, a MAC address, or any other identifier of the relay node. This is not limited in this embodiment. Any change in or replacement on the identifier of the relay node that can be easily figured out by a person of ordinary skill in the art shall fall within the technical scope disclosed in this embodiment. The donor node may obtain, by using the identifier of the relay node, information, for example, a cell radio network temporary identifier (C-RNTI), of the relay node that is transmitted through the air interface.

S502: After receiving the synchronization signal configuration request sent by the OAM node, the donor node returns a synchronization signal information configuration response message to the OAM node, to confirm that the request is received, and continues to perform step S503.

S503: The donor node sends the synchronization signal information to the relay node by using an RRC reconfiguration message. As described above, if the synchronization signal information received by the relay node from the OAM node indicates that the donor node is to send the synchronization signal information to the relay node, or it is defined in a protocol that the donor node is to send the synchronization signal information, the relay node waits to receive the synchronization signal information sent by the donor node. After receiving the synchronization signal information sent by the donor node, the relay node continues to perform step S504, and simultaneously performs step S408 shown in FIG. 4, that is, sends a synchronization signal. The synchronization signal information is described above, and details are not described again.

S504: The relay node sends an acknowledgment message to the donor node, where the acknowledgment message may be an RRC reconfiguration complete message.

According to the foregoing solution, a network actively triggers sending of the synchronization signal information, so that the relay node can obtain the synchronization signal information more quickly, thereby accelerating a process of obtaining the synchronization signal information by the relay node, and reducing air interface signaling overheads.

Figure 6:
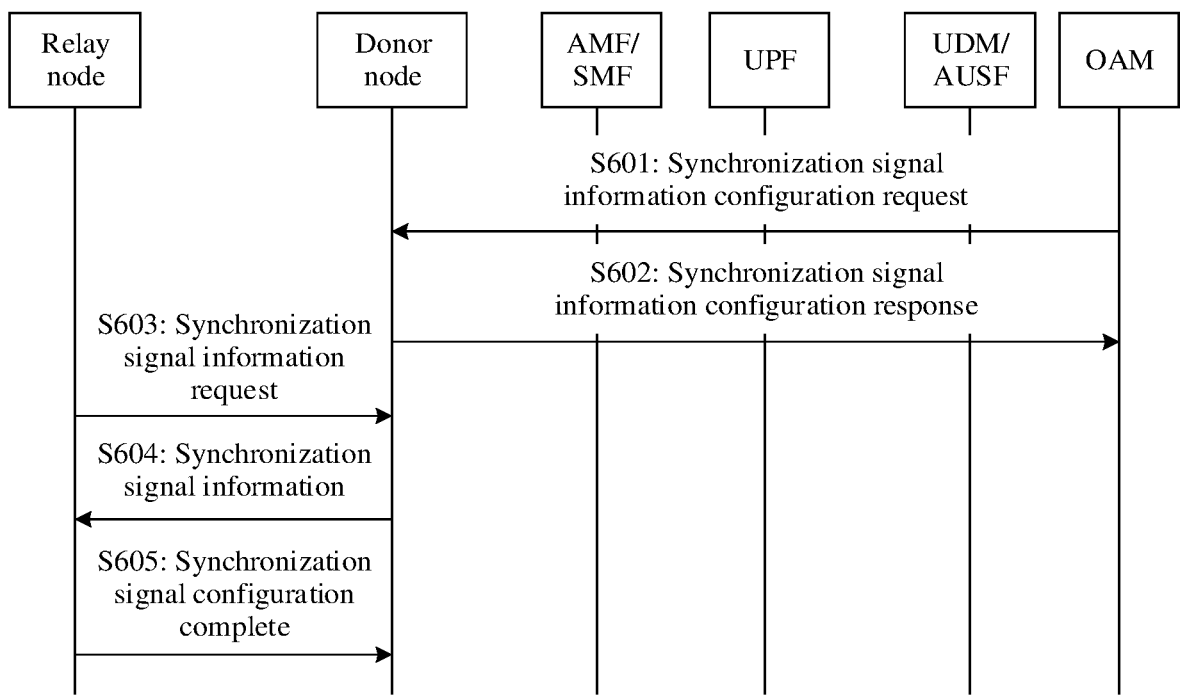
FIG. 6 is a flowchart in which a relay node requests synchronization signal information according to an embodiment of this application.

In an optional solution, as described above, step S406 and step S407 in FIG. 4 may alternatively be that the relay node actively initiates a synchronization signal request to obtain the synchronization signal information. FIG. 6 is a flowchart in which a relay node requests synchronization signal information according to an embodiment of this application. Steps are as follows:

Step S601 and step S602 are the same as step S501 and step S502, and details are not described again.

S603: If synchronization signal information received by the relay node from the OAM node indicates that the relay node actively initiates a synchronization signal information request to the donor node, or it is defined in a protocol that the relay node actively initiates a synchronization signal information request to the donor node after receiving a configuration parameter from the OAM node, the relay node sends the synchronization signal information request to the donor node after receiving the configuration of the synchronization signal information from the OAM node. The synchronization signal information request includes an indication for requesting a synchronization signal, and may further include an identifier of the relay node. A specific identifier is described above, and details are not described again. The synchronization signal information request may be an RRC message, or may be a specific MAC control element (CE).

S604: After receiving the synchronization signal information request, the donor node sends the synchronization signal information to the relay node, where the synchronization signal information may be carried in an RRC message, for example, an RRC reconfiguration message, or may be carried in a MAC CE. The synchronization signal information is described above, and details are not described again.

S605: After receiving the synchronization signal information, the relay node sends an acknowledgment message to the donor node, to confirm that the synchronization signal information is received. The acknowledgment message may be a synchronization signal configuration complete message, and the synchronization signal configuration complete message may be transmitted by using an RRC message such as an RRC reconfiguration complete message, or by using a MAC CE.

It should be understood that the synchronization signal information request, the synchronization signal information, and the synchronization signal configuration complete message may be a part of an RRC parameter, and RRC message names are unified. For example, the synchronization signal information request is a part of an RRC connection request message, and the RRC connection request is a unified message name and may be used for a plurality of requests. Similarly, the synchronization signal information is a part of the RRC reconfiguration message, and the synchronization signal configuration complete message is a part of the RRC reconfiguration complete message. This is merely an example and constitutes no limitation on an RRC message to which the synchronization signal information request, the synchronization signal information, and the synchronization signal configuration complete message belong.

After obtaining the synchronization signal information, the relay node performs step S408 shown in FIG. 4, to be specific, sends the synchronization signal.

In the foregoing solution, the relay node actively requests the synchronization signal information, and may select, based on a status of the relay node, a time at which sending of the synchronization signal information is requested. This is more flexible.

Figure 7:
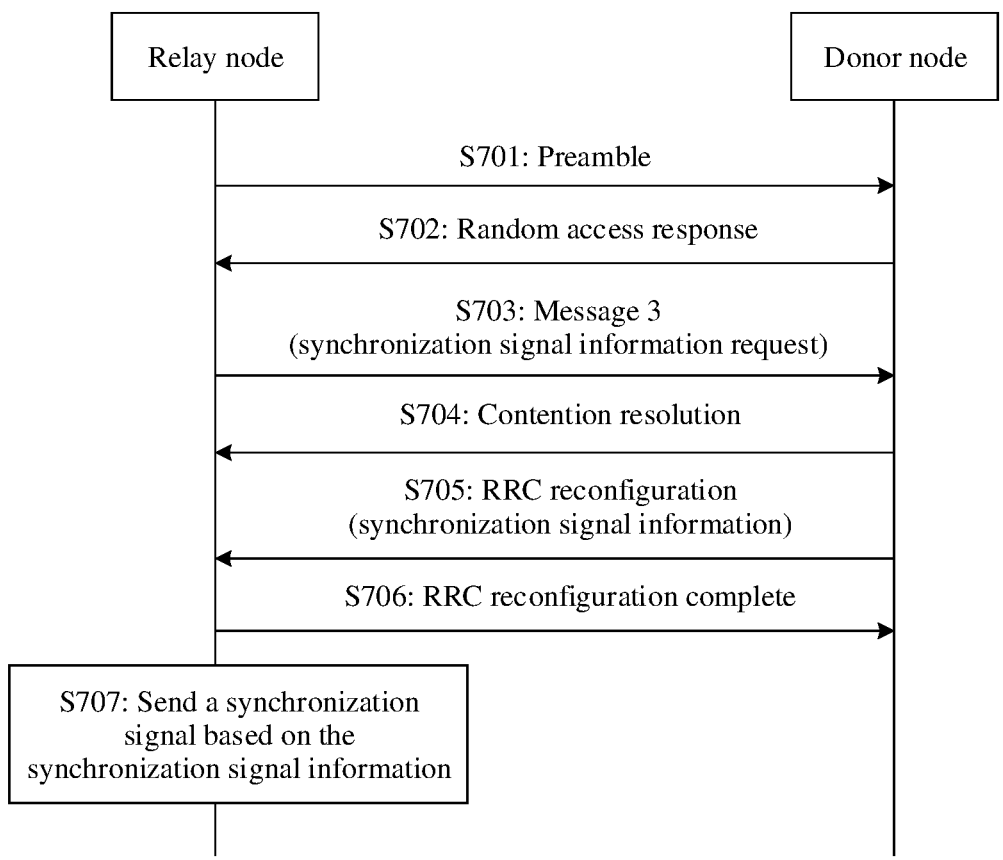
FIG. 7 is a flowchart in which a relay node obtains synchronization signal information in an access process according to an embodiment of this application.

In an optional solution, the relay node has completed parameter configuration in the second phase, to be specific, has sent the synchronization signal and provided a service for UE. In some cases, for example, the relay node is restarted due to power supply interruption or another reason, or a donor node is reselected from the donor node list provided in step S303 shown in FIG. 3 or step S403 shown in FIG. 4. In this case, if the donor node is re-accessed, the processes in the foregoing first and second phases may be performed. In an optional solution, the donor node may alternatively be directly accessed. FIG. 7 is a flowchart in which a relay node obtains synchronization signal information in an access process according to an embodiment of this application. Steps are as follows:

Step S701 and step S702 are a common random access process. Because the process is well known by a person of ordinary skill in the art, details are not described.

S703: The relay node sends a message 3 to a donor node, where the message 3 is the third message in the random access process, to be specific, a message initiated to the donor node after a random access response is received. Content carried in the message 3 varies depending on different purposes. For example, if UE initiates a service request, the message 3 includes an RRC connection establishment request message, or if UE is in a connected mode and loses synchronization, the message 3 includes data. When the relay node needs to obtain the synchronization signal information from the donor node, the relay node may send a synchronization signal information request in the message 3. The synchronization signal information request is an RRC message, for example, an RRC connection request message. The synchronization signal information request may include an indication for requesting a synchronization signal, and the RRC message may further include an identifier of the relay node. The identifier of the relay node is described above, and details are not described again. The indication for requesting the synchronization signal is used to notify the donor node that the relay node needs the donor node to send the synchronization signal information to the relay node.

S704: This process is the same as a conventional random access contention resolution process. Because the process is well known by a person of ordinary skill in the art, details are not described.

S705: The donor node sends an RRC reconfiguration message to the relay node. The RRC reconfiguration message includes the synchronization signal information or indication information of a synchronization signal obtaining manner. If the RRC reconfiguration message includes the synchronization signal information, the relay node generates the synchronization signal by using the synchronization signal information. The synchronization signal information is described above, and details are not described again.

If a carrier of the donor node is not divided into at least two BWPs, and the donor node configures the relay node as a layer 2 relay, the donor node may configure an operating carrier of the relay node to be the same as that of the donor node. In this case, the donor node may send indication information of only one synchronization signal obtaining manner to the relay node, where the indication information of the synchronization signal obtaining manner indicates the relay node to automatically read the synchronization signal information from an SS/PBCH block sent by the donor node, and generate the synchronization signal by using the read synchronization signal information.

In an optional solution, although the operating carrier of the donor node is not divided into the at least two BWPs, the donor node may configure the relay node to operate in a different carrier. In this case, the donor node needs to configure the synchronization signal information for the relay node. The synchronization signal information is described above, details are not described again.

S706: The relay node sends an acknowledgment message to the donor node, where the acknowledgment message may be an RRC reconfiguration complete message, to confirm that the synchronization signal information is received.

S707: The relay node sends the synchronization signal based on the received synchronization signal information. If the synchronization signal information received by the relay node indicates the relay node to automatically read the synchronization signal information from the SS/PBCH block sent by the donor node, the relay node obtains the synchronization signal information by reading the SS/PBCH block sent by the donor node, generates the synchronization signal and a PBCH, and sends the synchronization signal and the PBCH.

According to the foregoing solution, the relay node can implement fast access by using the donor node, so that a service interruption delay is reduced without performing a parameter configuration process again by using the OAM node, thereby accelerating a startup process and reducing the service interruption delay.

Figure 8:
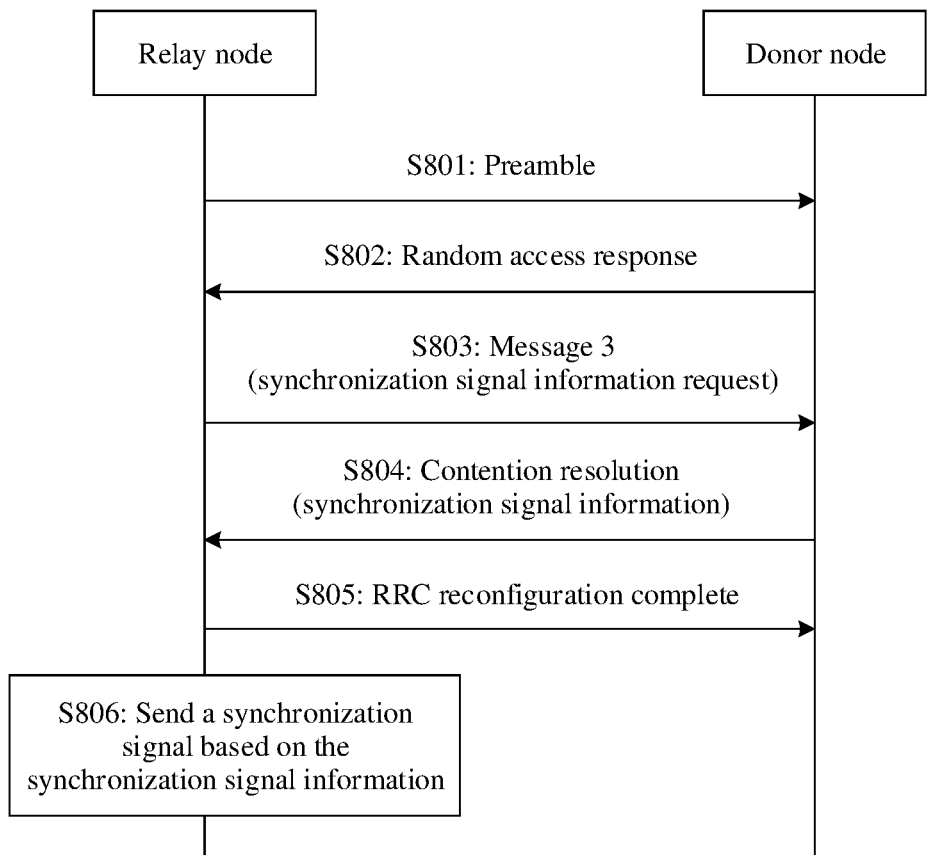
FIG. 8 is a flowchart in which a relay node obtains synchronization signal information from a contention resolution message according to an embodiment of this application.

In an optional solution, after receiving the synchronization signal request message sent by the relay node in the message 3, the donor node may alternatively send the synchronization signal information in the contention resolution message. FIG. 8 is a flowchart in which a relay node obtains synchronization signal information from a contention resolution message according to an embodiment of this application. Steps are as follows:

Step S801 to step S803 are the same as step S701 to step S703 shown in FIG. 7. Details are not described again.

S804: The donor node sends the synchronization signal information to the relay node by using the contention resolution message. The synchronization signal information is encapsulated in an RRC reconfiguration message, and the RRC reconfiguration message is a part of the contention resolution message. The synchronization signal information is described above, and details are not described again. It should be understood that when the synchronization signal information is encapsulated in the RRC reconfiguration message and is transmitted by using the contention resolution message, the RRC reconfiguration message should not be used as a part of a message authentication code for integrity (Message Authentication Code for Integrity, MAC-I) for contention resolution.

Similarly, the synchronization signal information may further include indication information of a synchronization signal obtaining manner. The indication information of the synchronization signal obtaining manner indicates the relay node to automatically read the synchronization signal information from an SS/PBCH block sent by the donor node. Details are described above, and are not described again.

Step S805 and step S806 are the same as step S706 and step S707, and details are not described again.

According to the foregoing solution, the relay node can obtain the synchronization signal information more quickly, thereby accelerating a configuration process.

Figure 9:
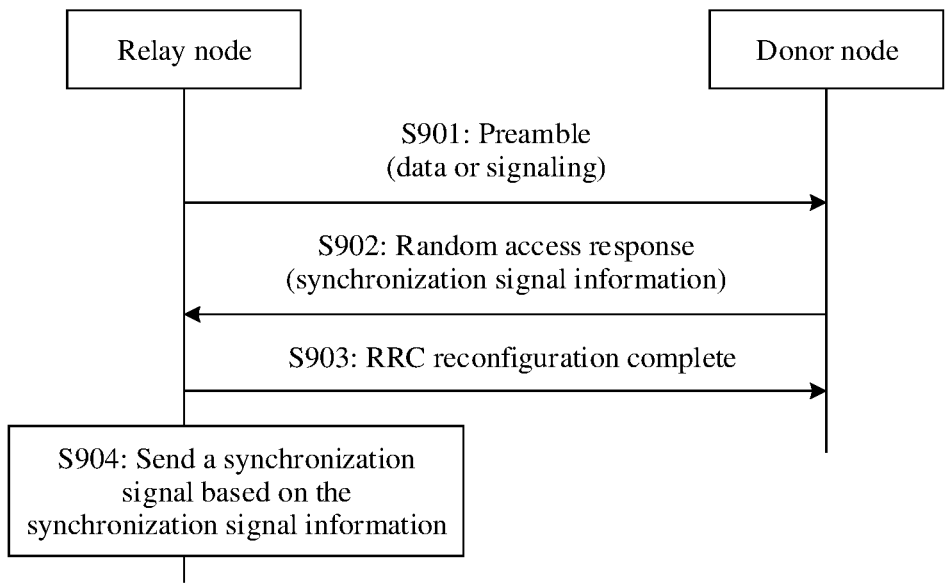
FIG. 9 is a flowchart of obtaining synchronization signal information in a two-step random access process according to an embodiment of this application.

In an optional solution, a faster access manner, namely, a two-step random access process may be considered for a future wireless network including a 5G access network. If the two-step random access process is used, a part of data information is sent in the first message during random access. FIG. 9 is a flowchart of obtaining synchronization signal information in a two-step random access process according to an embodiment of this application. Steps are as follows:

S901: A relay node sends a random access preamble to a donor node. A message used by the relay node to send the random access preamble may further carry a part of data or signaling. Because the message is the first message, and carries a very limited amount of data, only some basic information, such as an identifier of the relay node and an indication for requesting a synchronization signal, can be transmitted. The indication for requesting the synchronization signal is used to indicate the donor node to configure synchronization signal information for the relay node. The identifier of the relay node is described above, and details are not described again.

S902: After receiving the random access preamble and the data or signaling that is sent with the preamble, the donor node sends a random access response, referred to as a message 2, to the relay node. It should be understood that any change in or replacement on a message name falls within the protection scope of this application. The random access response message includes the synchronization signal information. Content included in the synchronization signal information is described above, and details are not described again. The synchronization signal information may be encapsulated in an RRC reconfiguration message, and is transmitted to the relay node by using the message 2.

S903: After receiving the synchronization signal information, the relay node sends an acknowledgment message to the donor node, to confirm that the synchronization signal information is received. The acknowledgment message is encapsulated in an RRC reconfiguration complete message for transmission. If the synchronization signal information received by the relay node includes all information for generating the synchronization signal, the relay node performs the following step S904. If the synchronization signal information received by the relay node includes indication information of a synchronization signal obtaining manner, and the indication information of the synchronization signal obtaining manner indicates the relay node to automatically read the synchronization signal information from an SS/PBCH block sent by the donor node, the relay node obtains the synchronization signal information by reading the SS/PBCH block sent by the donor node. Details are described above, and are not described again.

S904: After receiving the synchronization signal information in step S902 or automatically obtaining the synchronization signal information based on step S903, the relay node may send the synchronization signal based on the synchronization signal information.

According to the foregoing solution, the synchronization signal can be obtained in the two-step random access process, thereby accelerating a startup process and minimizing an interruption delay.

Figure 10:
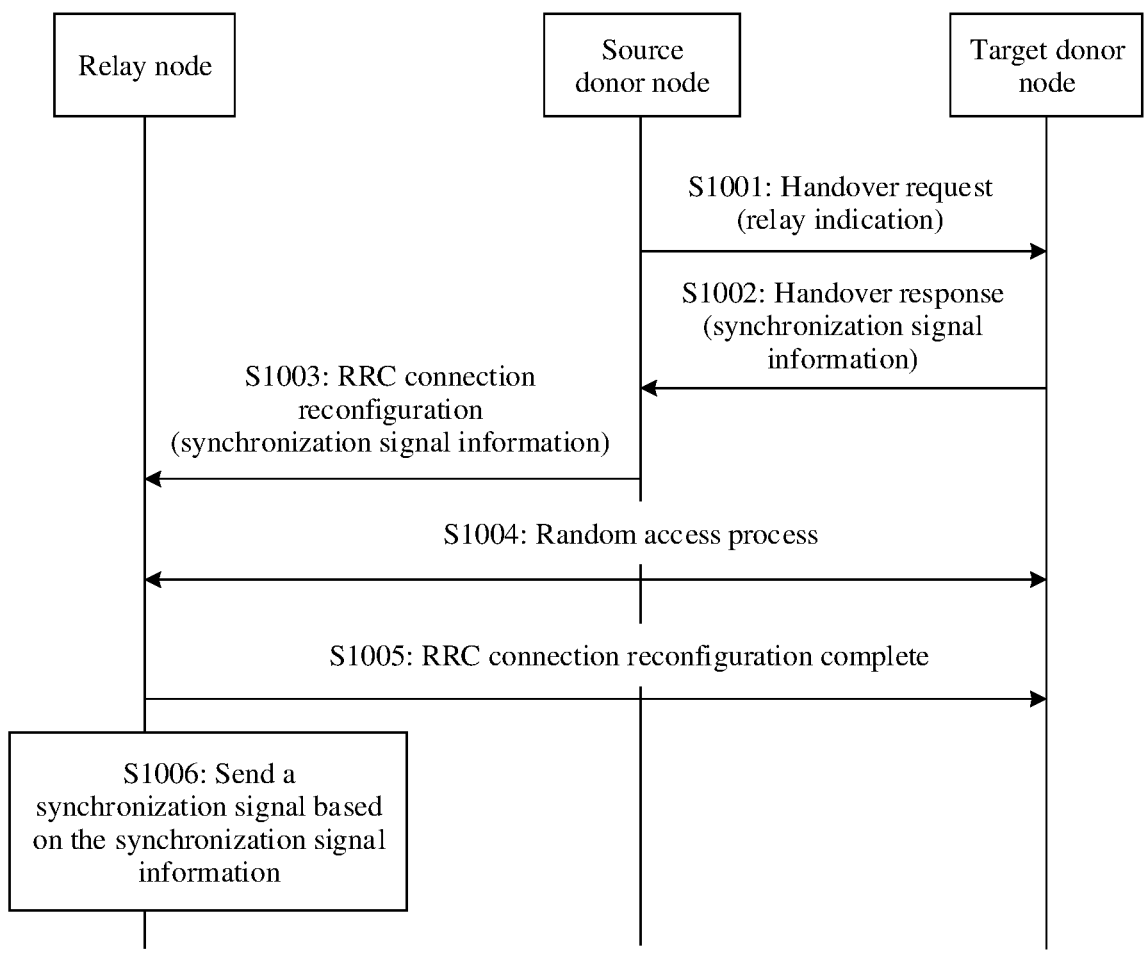
FIG. 10 is a flowchart of donor node handover according to an embodiment of this application.

In an optional solution, due to a requirement of an air interface change or a bandwidth change, one relay node may be capable of connecting to a plurality of optional donor nodes. In this case, possibly due to a change in a bandwidth of a backhaul link or channel quality of the backhaul link, the relay node may hand over from one donor node to another donor node. It should be understood that the handover herein is handover of the relay node, but not handover of UE served by the relay node. The handover may be actively initiated by a network, or may be caused by a measurement result for the relay node. FIG. 10 is a flowchart of donor node handover according to an embodiment of this application. Steps are as follows:

S1001: A source donor node initiates a handover request to a target donor node. The handover is that a relay node hands over from the source donor node to the target donor node. The handover request message indicates that the handover is handover of the relay node, and includes an identifier of the relay node. The identifier of the relay node may be described above, and details are not described again. After receiving the handover request, the target donor node may need to obtain a security parameter again, and interact with an AMF/SMF of a core network to obtain a new security parameter. A process of obtaining the security parameter complies with a protocol specification of a handover process, for example, the 3GPP 23.501 protocol. Details are not described.

S1002: The target donor node sends a handover response message to the source donor node, where the handover response message includes synchronization signal information of the target donor node, and the synchronization signal information is described above and details are not described again. Certainly, other handover information, for example, a C-RNTI, a dedicated access preamble, or an accessed time-frequency resource, configured for the relay node is further included, so that the relay node can access the target donor node. The target donor node may directly send, by using the handover response message, the synchronization signal information to the relay node by using the original donor node, or may indicate, by using indication information of a synchronization signal obtaining manner, the relay node to automatically obtain the synchronization signal information from the target donor node. This specifically depends on the donor node. This is not limited in this application. The synchronization signal information is encapsulated in a transparent container (transparent container), and is sent to the source donor node as a part of the handover response message. The transparent container may be, for example, an RRC connection reconfiguration message. The synchronization signal information may be a part of an IE (Information Element) of the RRC connection reconfiguration message. For example, the IE may be reconfigurationWithSync or mobilityControlInformation. The source donor node does not parse the transparent container, but forwards the transparent container to the relay node, that is, directly forwards the RRC connection reconfiguration message to the relay node. It should be understood that this is merely an example, and may alternatively be another IE or even another RRC message. This is not limited.

S1003: After the source node receives the handover response message from the target donor node, the source donor node does not parse the transparent container, but forwards the transparent container to the relay node, that is, directly forwards the RRC connection reconfiguration message to the relay node. The relay node obtains the synchronization signal information from the transparent container.

S1004: After receiving the RRC connection reconfiguration message (namely, the transparent container) from the target donor node, the relay node accesses the target donor node by using a random access parameter in the RRC connection reconfiguration message. The access process may be a contention-based random access process or a non-contention-based random access process. This process is well known by a person of ordinary skill, and details are not described.

If the synchronization signal information obtained in step S1003 includes the indication information of the synchronization signal obtaining manner, the indication information indicates the relay node to automatically obtain the synchronization signal information from the target donor node, so that the relay node obtains the synchronization signal information in a process of accessing the target donor node. A specific synchronization signal information is described above, and details are not described again.

S1005: After accessing the target donor node, the relay node sends an acknowledgment message to a target cell, where the acknowledgment message may be a connection reconfiguration complete message. After receiving the connection reconfiguration complete message, the target donor node requests a core network node to modify a route, so that data subsequently sent to the relay node is sent to the target donor node, and the target donor node receives data forwarded by the source donor node. This process is the same as a conventional handover process, and details are not described.

By performing the foregoing step S1004 and step S1005, the relay node may hand over to the target donor node, obtain the synchronization signal information from the target donor node, and be used as a cell or node of the target donor node.

S1006: After receiving the synchronization signal information sent by the target donor node by using the RRC message, the relay node generates a synchronization signal and sends the synchronization signal through an air interface. The relay node completes handover from the source donor node to the target donor node, and serves as a cell or node of the target donor node to provide a service for a terminal.

According to this embodiment, the donor node may be dynamically changed based on a service change status of the relay node and a backhaul link status, and the synchronization signal information is obtained in the handover process, so that a signaling procedure is simplified.

In an optional solution, when the donor node configures the synchronization signal information for the relay node, the configured synchronization signal information further includes a transmit power for the synchronization signal. Further, the synchronization signal information may further include a transmit power corresponding to a synchronization signal/physical broadcast channel block SS/PBCH block. A same transmit power or different transmit powers may be used for SS/PBCH blocks. A same transmit power may be used for a part of SS/PBCH blocks, and different transmit powers may be used for another part of SS/PBCH blocks. In NR, an SS/PBCH block is transmitted in a form of a beam in each direction in a time division manner. Because physical environments in the directions may vary greatly, transmit powers for beams in different directions may be adjusted to meet a coverage requirement. Therefore, when the synchronization signal is configured, each SS/PBCH block has a corresponding transmit power, and transmit powers for a part of SS/PBCH blocks are different from transmit powers for another part of SS/PBCH blocks. The synchronization signal herein refers to a general term of all SS/PBCH blocks transmitted in one synchronization signal periodicity, and the SS/PBCH block refers to a PSS, an SSS, and a PBCH that are sent on a specific time-frequency resource in one synchronization signal periodicity. A plurality of SS/PBCH blocks form a synchronization signal. A time-frequency resource occupied by the SS/PBCH block is specifically described in FIG. 2-1 and FIG. 2-2, and details are not described again.

According to this embodiment, transmit powers of the donor node on different SS/PBCH blocks may be configured, to meet different coverage requirements, or control coverage of the relay node.

In an optional solution, the relay node receives an identifier of another relay node and synchronization signal information of the another relay node that are sent by a parent node, and forwards the identifier of the another relay node and the synchronization signal information of the another relay node to the another relay node. Further, a message sent by the relay node to the another relay node may further include a correspondence between an identifier of a relay node and synchronization signal information. In an NR IAB system, a multi-hop relay is supported. When a multi-hop relay exists below the donor node, sometimes one or more other relay nodes exist between a relay node (or referred to as a target relay node) that needs to be configured and the donor node. In this case, when the donor node configures the relay node, configured information needs to be forwarded to the target relay node by using an intermediate relay node. However, in some cases, due to a change in the synchronization signal information of the donor node, for example, a change in a configuration of a subcarrier spacing of a frequency band, the synchronization signal information changes. In this case, one or more relay nodes of the donor node need to be reconfigured, and synchronization signal information of the one or more relay nodes may be different from synchronization signal information of another relay node. For example, transmit powers for SS/PBCH blocks are different. Therefore, the one or more relay nodes need to be configured.

Figure 11:
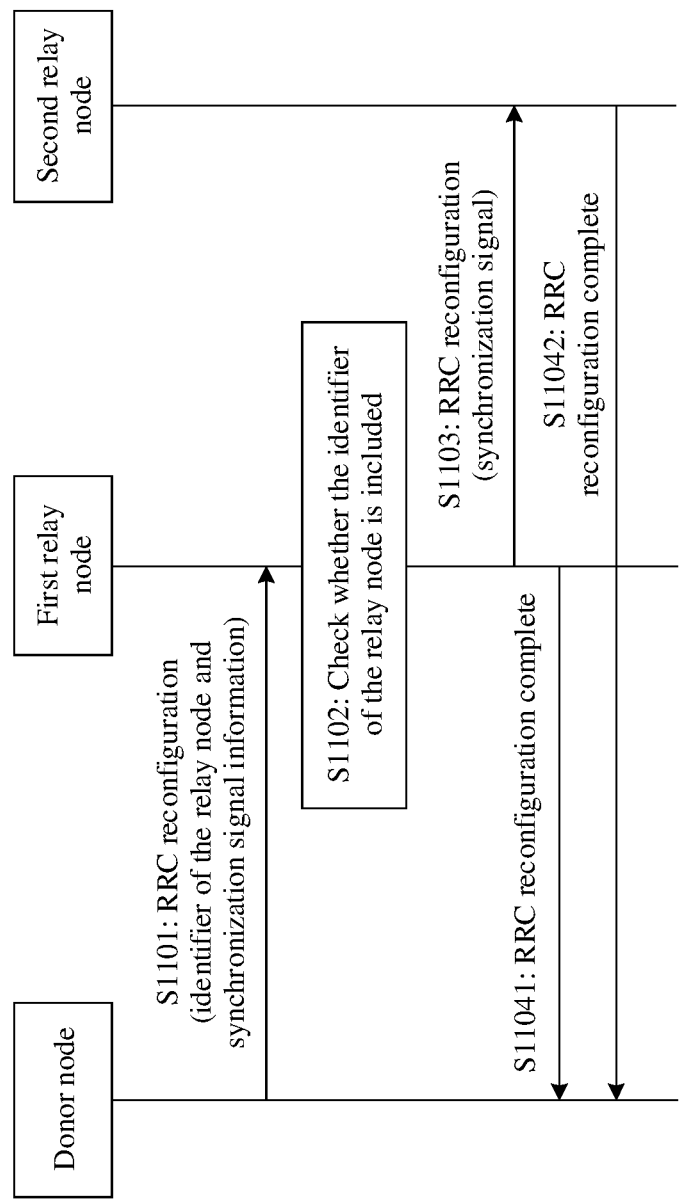
FIG. 11 is a flowchart of configuring synchronization signals for a plurality of levels of relay nodes according to an embodiment of this application.

FIG. 11 is a flowchart of configuring synchronization signals for a plurality of levels of relay nodes according to an embodiment of this application. The figure includes two relay nodes, which are respectively a first relay node and a second relay node, and the first relay node is a parent node of the second relay node. It should be understood that other relay nodes may further be included, and there is a parent-child relationship between the relay nodes. Steps are as follows:

S1101: A donor node sends an RRC reconfiguration message to a child relay node, where the RRC reconfiguration message includes an identifier of the relay node and synchronization signal information corresponding to the identifier of the relay node, that is, there is a correspondence between the identifier of the relay node and the synchronization signal information. Herein, a process of reconfiguring the synchronization signal information may be actively initiated by the donor node, or may be a process, of configuring the synchronization signal information, initiated by the donor node due to joining of a child relay node. It should be understood that the reconfiguration of the synchronization signal information initiated by the donor node herein may be triggered by another node, or may be triggered by a network. This is not limited in this embodiment.

S1102: After receiving the RRC reconfiguration message, the first relay node first determines whether the synchronization signal information in the RRC reconfiguration message is sent to the first relay node. For example, the first relay node obtains the identifier of the relay node from the RRC reconfiguration message, and if an identifier of the first relay node is included, the first relay node obtains the synchronization signal information of the first relay node from the RRC reconfiguration message, and performs step S1141 of returning an RRC reconfiguration complete message to the donor node. After obtaining the synchronization signal information of the first relay node in step S1102, the first relay node may generate a new synchronization signal based on the synchronization signal information, and send the new synchronization signal through an air interface.

If the first relay node finds that the RRC reconfiguration message includes an identifier of another relay node, and the another relay node is a child node of the relay node, the relay node forwards the identifier of the another relay node and synchronization signal information of the another relay node to the another relay node. The forwarded RRC reconfiguration message may include synchronization signal information of a plurality of other relay nodes. To distinguish between the synchronization signal information of the different relay nodes, the RRC reconfiguration message further includes a correspondence between an identifier of another relay node and synchronization signal information of the another relay node, to be specific, the identifier of the another relay node and the synchronization signal information of the another relay node are sent in a same message, and there is a correspondence between the identifier of the another relay node and the synchronization signal information of the another relay node. It is assumed herein that each relay node knows all child relay nodes and their routes, namely, a topology relationship between all the child relay nodes. It should be understood that if the RRC reconfiguration message sent by the donor node to the first relay node includes the identifier of the first relay node, the RRC reconfiguration message should not include, during forwarding, the identifier of the first relay node and the synchronization signal information corresponding to the identifier of the first relay node.

S1103: After S1102, if determining to forward the RRC reconfiguration message, the first relay node sends the RRC reconfiguration message to another relay node, namely, the second relay node. After receiving the RRC reconfiguration message, the second relay node performs the same check as that in S1102, and if the RRC reconfiguration message includes an identifier of the second relay node, the second relay node performs step S11042 of sending an RRC reconfiguration complete message to the donor node.

Specifically, if the first relay node finds that the RRC reconfiguration message includes an identifier of another relay node, and the another relay node is a child node of the relay node, the first relay node determines that the RRC reconfiguration message needs to be forwarded to the another relay node. It is assumed herein that the first relay node knows all child relay nodes and their routes, namely, a topology relationship between all the child relay nodes. If the first relay node knows none of the child relay nodes and their routes, the first relay node may find that the RRC reconfiguration message includes an identifier of another relay node, and the identifier of the another relay node is not a direct child node of the first relay node, the first relay node directly sends the RRC reconfiguration message including the identifier of the another relay node to the direct child relay node of the first relay node.

S11041 and S11042 are described above. If the RRC reconfiguration message sent by the donor node includes the identifier of the first relay node, the first relay node sends an acknowledgment message to the donor node. The acknowledgment message may be an RRC reconfiguration complete message, and the message includes the identifier of the first relay node. Similarly, the second relay node returns the RRC reconfiguration complete message, and the message includes the identifier of the second relay node. In an optional solution, the first relay node waits for RRC reconfiguration complete messages of all the child relay nodes of the first relay node, combines the RRC reconfiguration complete messages of all the child nodes into one message, and sends the message to the donor node.

The foregoing embodiment is also applicable to a scenario in which the donor node reconfigures the synchronization signal. In this case, if a synchronization signal of one node is reconfigured, the synchronization signal information includes a reconfiguration indication, and the reconfiguration indication corresponds to an identifier of the relay node.

In this embodiment, synchronization signal information may simultaneously be configured or reconfigured for a plurality of relay nodes. Especially when a synchronization signal of the donor node changes, the donor node may update the synchronization signal information of the plurality of relay nodes at one time, to avoid separate configuration for each relay node and reduce signaling overheads.

In an optional solution, the synchronization signal information further includes information about a BWP corresponding to the synchronization signal information, and the relay node sends the synchronization signal in the BWP based on the BWP information corresponding to the synchronization signal information. In NR, a carrier has a relatively large bandwidth. To meet different service requirements, a relatively large carrier is divided into different bandwidth pails. To be specific, all BWPs belong to one carrier and occupy a part of a bandwidth of the carrier. Different BWPs may have different numerologies, namely, different subcarrier spacings, and SS/PBCH blocks may be independently transmitted in the different BWPs. The SS/PBCH blocks transmitted in the BWPs may be different. For example, transmit powers for the SS/PBCH blocks may be different, and subcarrier spacings of the SS/PBCH blocks may be different. Therefore, the synchronization signal information needs to include the information about the BWP, to be specific, a BWP to which the synchronization signal information corresponds. After generating the synchronization signal based on the synchronization signal information, the relay node sends the synchronization signal in the corresponding BWP.

In this embodiment, the synchronization signal may be configured for different BWPs. When relay nodes configured by the donor node operate in different BWPs, because the different BWPs may be used to support different types of services, the relay nodes in the different BWPs may provide different services in different regions. Therefore, the relay nodes are configured in the different BWPs, so that the donor node can flexibly support different services at different positions in a cell. A numerology that adapts to a service is configured based on a service requirement. In this case, the relay node and the donor node may operate in different BWPs. Therefore, synchronization signal information varies. This manner enhances a service adaptation and adjustment capability of the network in NR, and optimizes network bandwidth to adapt to service deployment.

In all the foregoing embodiments, the synchronization signal information may be transmitted by using an RRC message. In an optional solution, a structure of an RRC message including synchronization signal information may be shown as follows:

```
-- ASN1START
-- TAG-SS-PBCH-BLOCK-MESSAGE-START
SS-PBCH-BLOCK-Message ::=    SEQUENCE {
physCellIdPart1              INTEGER (0..335),
physCellIdPart2              INTEGER (0..2),
numerologyParm               INTEGER (0..5),
freqindex                    INTEGER (0..maxBandNumber),
ssPeriod                     INTEGER (0..maxSSDuratoin),
physBroadcastCh              SEQUENCE {
    ssb-IndexExplicit        INTEGER (1..7)
    halfFrameindex           ENUMERATED {firstHalf,secondHalf}
    subCarrierSpacingCommon  SubcarrierSpacing,
    ssb-subcarrierOffset     INTEGER (0..11),
    dmrs-TypeA-Position      ENUMERATED {pos2, posS},
    pdcchConfigSIBl          INTEGER(0..255),
    cellBarred               ENUMERATED {barred, notBarred},
    inrraFreqReselection     ENUMERATED {allowed,
                                         notAllowed},
    spare                    BIT STRING (SIZE (ffsValue))
}
trxPowerofSSBList            SEQUENCE (SIZE (1..L))
targetBWPId                  INTEGER
                             (0..maxNrofBandwidthParts-1)
relayNcdeld                  BIT STRING (SIZE (40))
ssAcquiringWay               ENUMERATED {config,Auto},
}
-- TAG-SS-PBCH-BLOCK -MESSAGE-STOP
-- ASN1STOP
```

In the foregoing message, physCellIdPart1 is the first part of a PCI. A value ranges from 0 to 335 (including 0 and 335). physCellIdPart2 is the second part of the PCI. A value ranges from 0 to 2 (including 0 and 2). numerologyParm is used to determine a subcarrier spacing. For a specific value, refer to 38.211. A person of ordinary skill in the art may understand that different SS/PBCH blocks correspond to different numerology values. freqIndex is used to specify information about an operating frequency band of a relay node, and is indicated by using an index. The foregoing is merely an example, and a specific value is defined according to a protocol. ssPeriod is a SS/PBCH block transmission periodicity. A definition of the periodicity is described in the foregoing embodiments, and details are not described again. physBroadcastCh is PBCH configuration information. It should be understood that a PBCH herein is different from a MIB (MIB) defined in the 3GPP 38.331 protocol. The PBCH herein is mainly used to determine some initialization parameters. However, some dynamic parameters do not need to be transmitted, and may be obtained by the relay node from the donor node. Therefore, the PBCH is different from the MIB defined in the 3GPP TS 38.331 protocol. A part of or all parameters may be selected for configuration as required. For a specific PBCH parameter, refer to MIB information in the 3GPP TS 38.331 protocol. In addition, a transmit power for each SS/PBCH block, BWP index information, an identifier of the relay node, and indication information of a synchronization signal obtaining manner may further be included.

It should be understood that the foregoing is merely an example in which one piece of synchronization signal information is carried in an RRC message. Parameters in the RRC message including the synchronization signal information in this embodiment may be configured by selecting different parameters based on different scenarios, that is, a part of parameters are optional. For example, if a donor node indicates a relay node to automatically obtain synchronization signal information from a synchronization signal of the donor node, only indication information ssAcquiringWay of a synchronization signal obtaining manner may be included. When the relay node is a layer 2 relay, especially in a scenario in which different BWPs are supported, a subcarrier spacing, half-frame index information on a PBCH, DMRS information, BWP index information, and the like may be configured. It should be understood that a specific configuration of the synchronization signal information may be flexibly configured as required. Any change or replacement that can be figured out by a person of ordinary skill in the art shall fall within the protection scope of this application. It should be understood that, if an OAM node configures the synchronization signal information for the relay node, a transmission format of the synchronization signal information may be different from the foregoing RRC message format, but content of the synchronization signal information is the same as that of the RRC message. Details are not described again.

It should be understood that the foregoing is only a possible representation manner of a data structure of the synchronization signal information of the RRC message when the synchronization signal information is transmitted by using the RRC message. However, the representation manner is not limited, and the synchronization signal information may be represented in another manner. For example, when the OAM node transmits the synchronization signal information to the relay node, the synchronization signal information may be transmitted in another structured representation manner. For example, each parameter may be transmitted in a format of a type, a length, or a value. For example, a type code is used to represent a meaning of a field. For example, a type code of physCellIdPart1 is 000001 in binary, and a length indicates a length corresponding to a value of the type code, and is usually represented by bytes or bits. The value is a specific configured value. For example, the value of physCellIdPart1 is 99. It should be understood that, this is merely an example, and a configuration of a field of the synchronization signal information is not limited herein. A specific representation manner of the type, the length, and the value of each field depends on a protocol definition, and details are not described.

The foregoing mainly describes the solutions provided in the embodiments of this application from a perspective of interaction between the network elements. It may be understood that, to implement the foregoing functions, each of the network elements, for example, the relay node, the donor node, and the OAM node, includes a corresponding hardware structure and/or software module for performing each function. A person of ordinary skill in the art should easily be aware that, in combination with the examples described in the embodiments disclosed in this specification, network elements, algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, each of the relay node and the donor node may be divided into functional modules based on the foregoing method examples. For example, each of the relay node and the donor node may be divided into functional modules, or two or more functions may be integrated into one processing module. The integrated module may be implemented in a form of hardware, or may be implemented in a form of a software functional module. It should be noted that, in this embodiment of this application, module division is an example, and is merely a logical function division. In an actual implementation, another division manner may be used.

Figure 12:
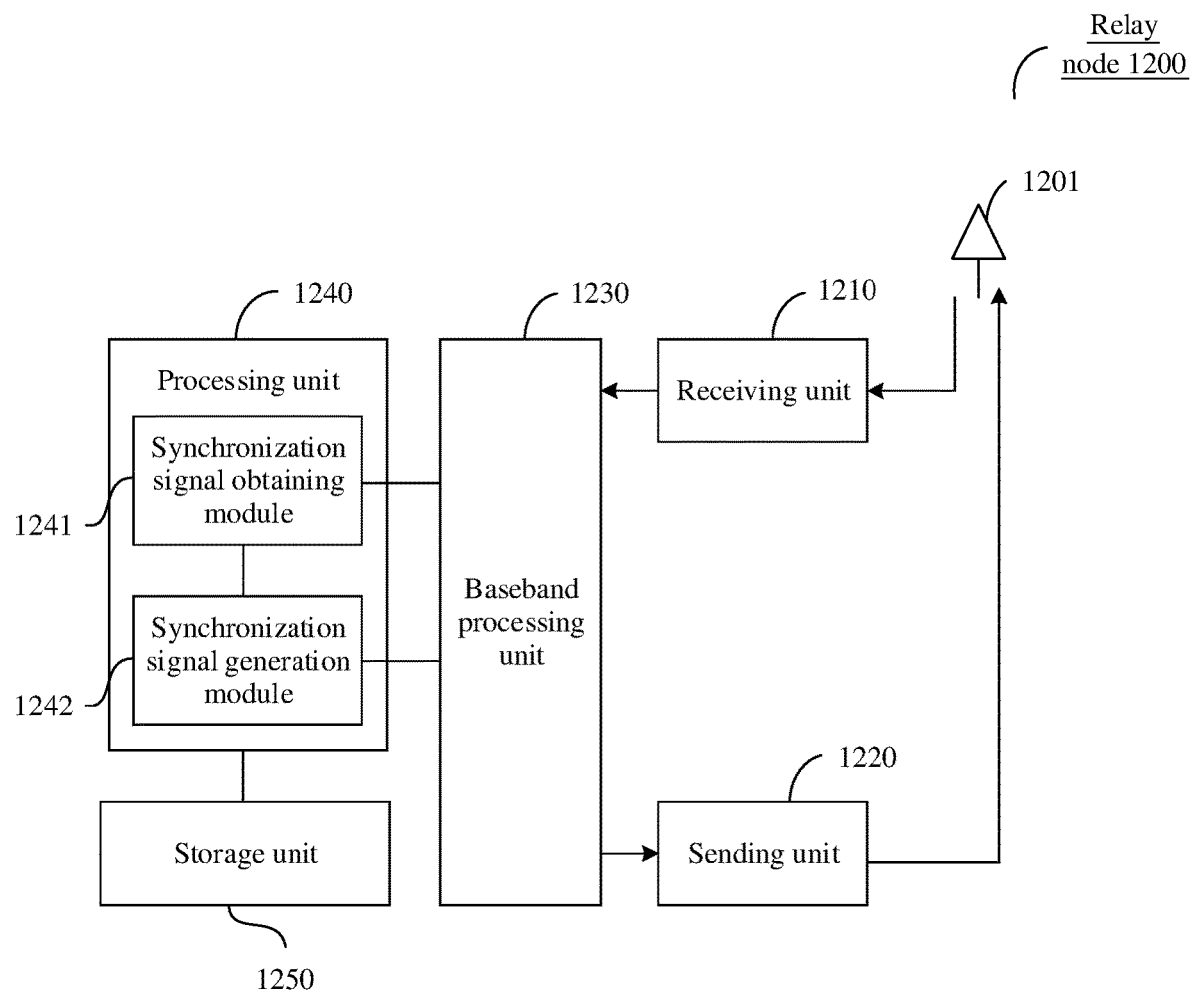
FIG. 12 is a schematic diagram of a possible structure of a relay device according to an embodiment of this application.

FIG. 12 is a schematic diagram of a possible structure of the relay device in the foregoing embodiments provided in this application. In this application, a relay node is also referred to as a relay device. A relay device 1200 includes at least a receiving unit 1210, a processing unit 1240, and a sending unit 1220. The receiving unit 1210 is configured to receive synchronization signal information sent by a parent node through an air interface, where the synchronization signal information includes at least one of the following information: a subcarrier spacing of a synchronization signal, information about an operating frequency band of the relay node, information about a physical broadcast channel of the relay node, a synchronization signal periodicity, and indication information of a synchronization signal obtaining manner. The processing unit 1240 is configured to generate the synchronization signal based on the synchronization signal information. The sending unit 1220 is configured to send the synchronization signal generated by the processing unit 1240.

The receiving unit 1210 is further configured to receive an identifier of another relay device and synchronization signal information of the another relay device that are sent by the parent node. The sending unit 1220 is configured to forward the identifier of the another relay device and the synchronization signal information of the another relay device to the another relay device.

The processing unit 1240 may further include a synchronization signal obtaining module 1241 and a synchronization signal generation module 1242. The synchronization signal obtaining module 1241 is configured to send a synchronization signal request to the parent node, to request to obtain the synchronization signal information of the relay device. The synchronization signal request may include an indication for requesting the synchronization signal information, and the identifier of the relay device may further be sent together with the synchronization signal request. The synchronization signal obtaining module 1241 may alternatively be configured to obtain the synchronization signal information sent by an OAM node. The synchronization signal generation module 1242 may generate, based on the synchronization signal information obtained by the synchronization signal obtaining module, a parameter required for sending the synchronization signal at a physical layer. The parameter required for sending the synchronization signal at the physical layer may include an index and a bandwidth of a BWP, a transmit power, a DMRS, a PSS-related parameter, an SSS-related parameter, and a PBCH-related parameter. Specifically, the PSS-related parameter includes physCellIdPart2 (namely, a synchronization signal group to which a PSS belongs), the SSS-related parameter includes physCellIdPart1, the PBCH-related parameter includes at least one of the following information: ssb-IndexExplicit, a half-frame index, a subcarrier spacing, a subcarrier offset, a DMRS position, a configuration of a physical PDCCH of a SIB 1, a cell access barring indication, a cell frequency selection indication, and the like. Specific parameters are described above, and details are not described again.

For content of the synchronization signal information, a configuration of the synchronization signal information, a manner of obtaining the synchronization signal information, and the like, refer to the descriptions in the foregoing method embodiments, and details are not described herein again.

The relay device 1200 may further include a baseband processing unit 1230, configured to: perform baseband processing on the synchronization signal parameter of the synchronization signal generation module 1242, and send the processed synchronization signal parameter by using the sending unit 1220, or configured to perform baseband processing on the synchronization signal information received from the parent node (for example, a donor node), to obtain the synchronization signal information of the relay device. The baseband processing unit 1230 may further be configured to: process the synchronization signal of the relay device, and send the obtained synchronization signal information to the synchronization signal obtaining module 1241. The baseband processing mainly includes channel coding and baseband signal modulation. A baseband processing process varies with different air interface technologies. For example, baseband processing in LTE or NR mainly includes processes of resource de-mapping, de-precoding, demodulation, channel decoding, and descrambling. A bitstream is obtained through the baseband processing. If data needs to be sent to a higher layer for processing, the data is sent to the processing unit 1240. The baseband processing unit may further process a data stream from the higher layer. For example, baseband processing in LTE or NR mainly includes processes of scrambling, channel coding, modulation, layer mapping, precoding, resource mapping, and inverse Fourier transform, so that a baseband signal stream is formed and is sent to the sending unit for sending. It should be understood that the foregoing baseband receiving processing and sending processing processes are merely examples, and constitute no limitation on this embodiment. The baseband processing is already well known by a person of ordinary skill in the art, and details are not described.

The processing unit 1240 may be implemented by using one or more processors, and the baseband processing unit 1230 may be implemented by using a baseband processor. Each of the processor and the baseband processor may be a central processing unit, a general-purpose processor, a digital signal processor, an application-specific integrated circuit, a field programmable gate array or another programmable logic device, a transistor logic device, a hardware component, or any combination thereof. The processor and the baseband processor may be two separate chips, or may be integrated together to form one chip.

In addition, the relay device 1200 may further include an antenna 1201. It should be understood that the antenna 1201 may be a part of the receiving unit 1210 and the sending unit 1220, or may be separated from the receiving unit 1210 and the sending unit 1220 and exist as an independent component. The receiving unit 1210 is configured to process a received radio frequency signal. In terms of hardware implementation, the receiving unit 1210 may include a radio frequency front-end circuit and a radio frequency receive circuit. It should be understood that the receiving unit 1210 in FIG. 12 is merely an example, and the receiving unit 1210 may further include another unit, an interface, or the like. In terms of hardware implementation, the radio frequency front-end circuit mainly includes a filter and an amplifier. The filter and the amplifier are configured to filter and amplify a signal received by the antenna, and then transmit the filtered and amplified signal to the radio frequency receive circuit. The radio frequency receive circuit is mainly configured to perform frequency mixing, filtering, power amplification, analog-to-digital conversion, and the like on the signal output by the radio frequency front-end circuit, to form a signal suitable for being processed by the baseband processing unit 1230. All the signals received by the relay node from other nodes or devices in FIG. 3 to FIG. 11 are processed by the receiving unit 1210 and transmitted to the baseband processing unit 1230.

Correspondingly, the sending unit 1220 includes a radio frequency transmit circuit and a radio frequency front-end circuit. It should be understood that the sending unit in FIG. 12 may further include another unit or interface in a specific implementation. Signal processing performed by the radio frequency transmit circuit may be an inverse process of signal processing performed by the radio frequency receive circuit, and the radio frequency transmit circuit is mainly configured to convert a baseband signal into a high-frequency signal. For example, the radio frequency transmit circuit may perform digital-to-analog conversion, frequency mixing, filtering, and power amplification. Signal processing performed by the radio frequency front-end circuit of the sending unit may also be an inverse process of signal processing performed by the radio frequency front-end circuit of the receiving unit. For example, the signal is amplified and filtered, and the processed signal is sent by using the antenna 1201. All the signals that need to be sent by the processing unit 1240 of the relay node to other nodes, terminals, or devices in FIG. 3 to FIG. 11 are processed by the sending unit 1220 and transmitted by using the antenna 1201.

In the relay device, the receiving unit 1210 and the sending unit 1220 may share one or more antennas. It should be understood that there may be a plurality of antennas in a wireless network to implement a multiple-input multiple-output technology to improve a system throughput. The figure is merely an example, but does not limit a quantity of antennas.

In terms of hardware implementation, the receiving unit 1210 may be a receiver, the sending unit 1220 may be a transmitter, and the receiver and the transmitter may form a communications interface. It should be understood that the communications interface may further include another physical interface, for example, a configuration interface, configured to connect to the relay node in a wired manner to configure the relay node, including configuring synchronization signal information. The receiver may include only the radio frequency receive circuit and the transmitter may include only the radio frequency transmit circuit. The radio frequency front-end circuit in the receiving unit 1210 and the radio frequency front-end circuit in the sending unit 1220 may be implemented in another independent component. The radio frequency receive circuit and the radio frequency transmit circuit are integrated into one chip for implementation, to form a radio frequency transceiver. When the radio frequency front-end circuit and the radio frequency transceiver are implemented in separate components, the communications interface includes the radio frequency front-end circuit and a radio frequency transceiver, and the radio frequency front-end circuit is coupled to the radio frequency transceiver. The communications interface may further include another interface, for example, a configuration interface. The receiver and the transmitter may further include a transceiver interface of another module. Herein, only a physical example is used to describe the receiver and the transmitter. However, it should not be understood that the receiver and the transmitter are a physical radio frequency transceiver circuit. The receiver and the transmitter are merely names, may exist in a plurality of modules, and may be implemented in a software manner or a hardware manner. This is not limited in this application.

In terms of hardware implementation, the relay device may further include: a storage unit 1250 (for example, a memory), configured to store code required by the processing unit 1240 and/or the baseband processing unit 1230. When executing the code in the memory, the processing unit 1240 or the baseband processing unit 1230 can implement a function of the processing unit 1240 or the baseband processing unit 1230.

Figure 13:
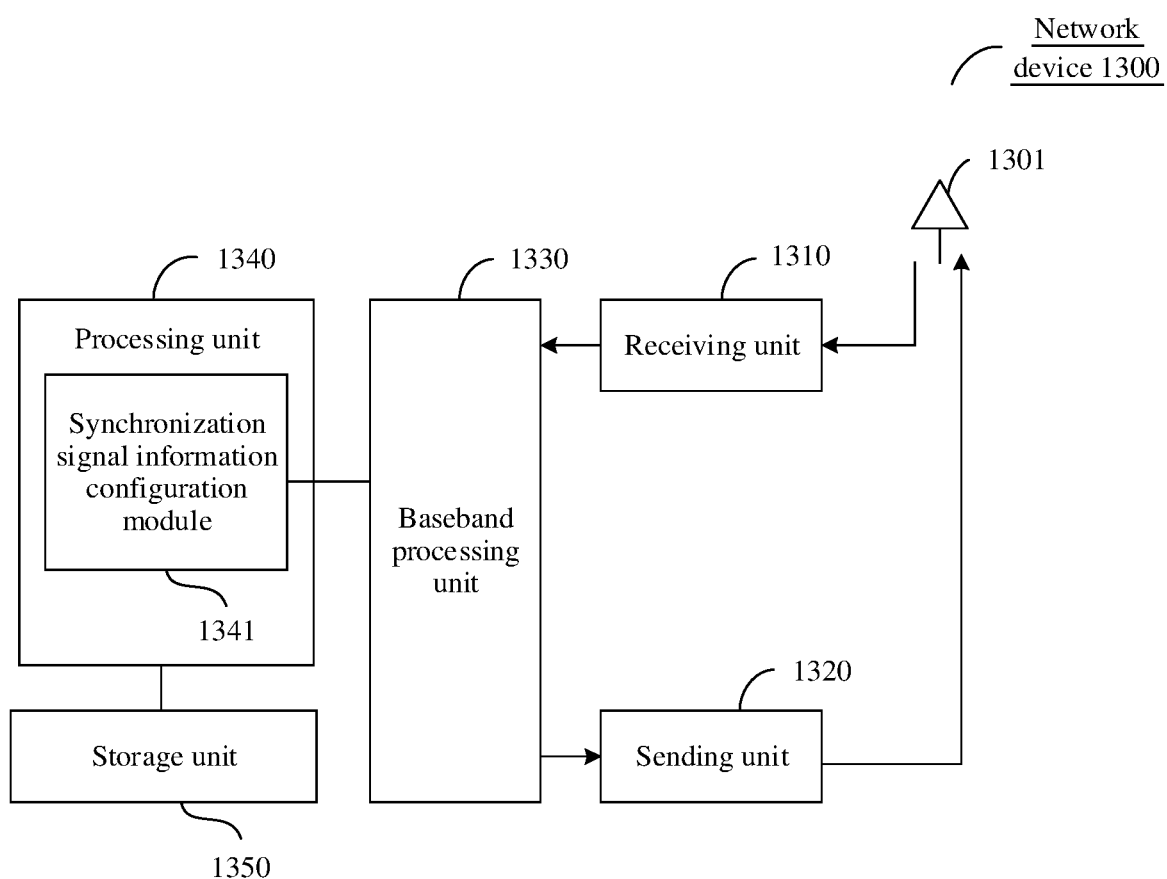
FIG. 13 is a schematic diagram of a possible logical structure of a network device according to an embodiment of this application.

FIG. 13 is a schematic diagram of a possible structure of the network device in the foregoing embodiments provided in this application. A network device 1300 includes at least: a processing unit 1340, configured to generate synchronization signal information of a relay node, where the synchronization signal information includes at least one of the following information: a subcarrier spacing of a synchronization signal, information about an operating frequency band of the relay node, information about a physical broadcast channel of the relay node, a synchronization signal periodicity, and indication information of a synchronization signal obtaining manner, a sending unit 1320, configured to send the synchronization signal information to the relay node through an air interface, and a receiving unit 1310, configured to receive an acknowledgment message sent by the relay node.

The receiving unit 1310 is further configured to receive a synchronization signal information request sent by the relay node, where the synchronization signal information request is used to request the network device to send the synchronization signal information of the relay node to the relay node.

The receiving unit 1310 is further configured to receive a synchronization signal information configuration request sent by an operation, administration and maintenance node, where the synchronization signal information configuration request is used to indicate the network device to send the synchronization signal information of the relay node to the relay node. The processing unit 1340 is configured to generate the synchronization signal information of the relay node based on the synchronization signal information configuration request.

The processing unit 1340 may further include a synchronization signal information configuration module 1341, configured to: process the synchronization signal information request sent by the relay node, and determine the synchronization signal information for the relay node that sends the synchronization signal information request. The determining the synchronization signal information includes: determining, by the processing unit based on a position of the relay node or a service distribution status of a current cell, for example, services at a position are relatively congested, to configure the relay node to operate in a BWP, or to configure the relay node to operate in a same carrier or in a same BWP as a donor node. After determining the BWP or the carrier in which the relay node operates, the processing unit 1340 generates the synchronization signal information for the relay node, and responds to the synchronization signal information request sent by the relay node.

The processing unit 1340 may further be configured to: process the synchronization signal information configuration request from the OAM node, generate the synchronization signal information for the relay node based on the indication information of the synchronization signal obtaining manner in the synchronization signal information configuration request, and respond to the synchronization signal information configuration request from the OAM node. If the indication information of the synchronization signal obtaining manner that is included in the synchronization signal information configuration request sent by the OAM node indicates the network device 1300 to actively send the synchronization signal information to the relay node, the processing unit 1340 generates the synchronization signal information for the specified relay node, and sends the synchronization signal information by using the sending unit 1320.

The processing unit 1340 is further configured to obtain an identifier of the relay node. The sending unit 1320 is configured to transmit the identifier of the relay node and the synchronization signal information of the relay node to the relay node, so that the relay node obtains the synchronization signal information of the relay node based on the identifier of the relay node.

The network device 1300 may further include a baseband processing unit 1330, configured to: perform baseband processing on synchronization signal information to be sent (for example, the synchronization signal information to be sent by the synchronization signal information configuration module 1341), and send the processed synchronization signal information by using the sending unit 1320, and is further configured to: perform baseband processing on the synchronization signal information request received from the relay node, and send a baseband processing result to a higher layer, for example, the synchronization signal information configuration module 1341. The baseband processing mainly includes channel coding and baseband signal modulation. A baseband processing process varies with different air interface technologies. For example, baseband processing in LTE or NR mainly includes processes of resource de-mapping, de-precoding, demodulation, channel decoding, and descrambling. A bitstream is obtained through the baseband processing. If data needs to be sent to a higher layer for processing, the data is sent to the processing unit

1340. The baseband processing unit 1330 may further process a data stream from the processing unit 1340. For example, baseband processing in LTE or NR mainly includes processes of scrambling, channel coding, modulation, layer mapping, precoding, resource mapping, and inverse Fourier transform, so that a baseband signal stream is formed and is sent to the sending unit 1320 for sending. It should be understood that the foregoing baseband receiving processing and sending processing processes are merely examples, and constitute no limitation on this embodiment. The baseband processing is already well known by a person of ordinary skill in the art, and details are not described.

The processing unit 1340 may be implemented by using one or more processors, and the baseband processing unit 1330 may be implemented by using a baseband processor. Each of the processor and the baseband processor may be a central processing unit, a general-purpose processor, a digital signal processor, an application-specific integrated circuit, a field programmable gate array or another programmable logic device, a transistor logic device, a hardware component, or any combination thereof. The processor and the baseband processor may be two separate chips, or may be integrated together to form one chip.

In addition, the network device 1300 may further include an antenna 1301. It should be understood that the antenna 1301 may be a part of the receiving unit 1310 and the sending unit 1320, or may be separated from the receiving unit 1310 and the sending unit 1320 and exist as an independent component.

The receiving unit 1310 is configured to process a received radio frequency signal. In terms of hardware implementation, the receiving unit 1310 includes a radio frequency front-end circuit and a radio frequency receive circuit. It should be understood that the receiving unit 1310 in FIG. 13 is merely an example, and the receiving unit 1310 may further include another unit, an interface, or the like. In terms of hardware implementation, the radio frequency front-end circuit and the radio frequency receive circuit of the receiving unit 1310 are the same as those described in FIG. 12, and details are not described again. The receiving unit 1310 is further configured to receive a message from another network element, for example, the OAM node. In FIG. 3 to FIG. 11, all signals received by the network device from the relay device are processed by the receiving unit 1310 and transmitted to the baseband processing unit 1330, or another interface of the receiving unit 1310 receives information from another network element, for example, the OAM node.

The sending unit 1320 includes a radio frequency transmit circuit and a radio frequency front-end circuit. It should be understood that the sending unit 1320 in FIG. 13 may further include another unit or interface in a specific implementation. Basic functions of the radio frequency transmit circuit and the radio frequency receive circuit are described above, and details are not described again. In FIG. 3 to FIG. 11, all signals that need to be sent by the processing unit 1340 of the network device to the another relay device and another terminal are processed by the sending unit 1320 and then sent by using the antenna 1301, or the processing unit 1340 of the network device sends a message to another network element such as the OAM node through another interface of the sending unit 1320.

The sending unit 1320 is further configured to send an identifier of another relay node and synchronization signal information of the another relay node to the relay node, so that the relay node sends the identifier of the another relay node and the synchronization signal information of the another relay node to the another relay node.

In the network device, the receiving unit 1310 and the sending unit 1320 may share one or more antennas. It should be understood that there may be a plurality of antennas in a wireless network to implement a multiple-input multiple-output technology to improve a system throughput. The figure is merely an example, but does not limit a quantity of antennas.

In terms of hardware implementation, the receiving unit 1310 may be a receiver, the sending unit 1320 may be a transmitter, and the receiver and the transmitter may form a communications interface. It should be understood that the communications interface may further include another physical interface, for example, an interface for communicating with a core network, and is configured to connect to another network element, for example, a gateway device, in a wired manner. The receiver may include only the radio frequency receive circuit and the transmitter may include only the radio frequency transmit circuit. The radio frequency front-end circuit in the receiving unit 1310 and the radio frequency front-end circuit in the sending unit 1320 may be implemented in another independent component. The radio frequency receive circuit and the radio frequency transmit circuit are integrated into one chip for implementation, to form a radio frequency transceiver. When the radio frequency front-end circuit and the radio frequency transceiver are implemented in separate components, the communications interface includes the radio frequency front-end circuit and the radio frequency transceiver, and the radio frequency front-end circuit is coupled to the radio frequency transceiver. The communications interface may further include another wired interface, such as an ethernet interface or an optical fiber interface. It should be understood that the communications interface should not be simply understood as a radio frequency interface. The receiver and the transmitter may further include a transceiver interface of another module. Herein, only a physical example is used to describe the receiver and the transmitter. However, it should not be understood that the receiver and the transmitter are a physical radio frequency transceiver. The receiver and the transmitter are merely names, may exist in a plurality of modules, and may be implemented in a software manner or a hardware manner. This is not limited in this application.

In terms of hardware implementation, the network device may further include: a storage unit 1350 (for example, a memory), configured to store code required by the processing unit 1340 and/or the baseband processing unit 1330. When executing the code in the memory, the processing unit 1340 or the baseband processing unit 1330 can implement a function of the processing unit 1340 or the baseband processing unit 1330.

In another embodiment of this application, a readable storage medium is further provided. The readable storage medium stores a computer executable instruction. When a device (which may be a single-chip microcomputer, a chip, or the like) or a processor performs the steps performed by the relay node and the donor node in the method for sending a synchronization signal provided in FIG. 3 to FIG. 11, the device or the processor reads the computer executable instruction in the storage medium. The foregoing readable storage medium may include: any medium that can store program code, such as a removable hard disk, a read-only memory, a random access memory, a magnetic disk, or an optical disc.

In another embodiment of this application, a computer program product is further provided. The computer program product includes a computer executable instruction, and the computer executable instruction is stored in a computer-readable storage medium. At least one processor of a device may read the computer executable instruction from the computer-readable storage medium, and the at least one processor executes the computer executable instruction, so that the device implements the steps performed by the relay node and the donor node in the method for sending a synchronization signals provided in FIG. 3 to FIG. 11.

In another embodiment of this application, a communications system is further provided. The communications system includes at least a relay node and a donor node. The relay node may be the relay node provided in FIG. 12, and is configured to perform the steps performed by the relay node in the method for sending a synchronization signals provided in FIG. 3 to FIG. 11, and/or the donor node may be the network device provided in FIG. 13, and is configured to perform the steps performed by the network node in the method for sending a synchronization signals provided in FIG. 3 to FIG. 11. It should be understood that the communications system may include a plurality of relay nodes, and the donor node may simultaneously configure synchronization signal information for the plurality of relay nodes.

In this embodiment of this application, after obtaining the synchronization signal information from the donor node or an OAM node, the relay node may generate a synchronization signal based on the synchronization signal information, determine information about a PBCH, and send the synchronization signal on a resource specified for an SS/PBCH block, to resolve a problem of configuring the synchronization signal information when the relay node is started.

In conclusion, the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method comprising:
   receiving, by a relay node, synchronization signal information sent by a donor node of the relay node through an air interface, the relay node being configured to access a wireless communication network through the donor node, the synchronization signal information being configured for the relay node and enabling the relay node to generate a synchronization signal of the relay node, and the synchronization signal information comprising a physical cell identifier (PCI) of the relay node that is different from a PCI of the donor node, and the synchronization signal information further comprising a synchronization signal subcarrier spacing, information about an operating frequency band of the relay node, and a synchronization signal periodicity;
   generating, by the relay node, a synchronization signal sequence based on the PCI of the relay node comprised in the synchronization signal information to generate the synchronization signal of the relay node; and
   sending, by the relay node, the synchronization signal including the synchronization signal sequence that is generated.

2. The method according to claim 1, wherein the method further comprises:
   sending, by the relay node, a synchronization signal information request to the donor node, to request to obtain the synchronization signal information of the relay node.

3. The method according to claim 1, wherein the synchronization signal information further comprises information about a bandwidth part corresponding to the synchronization signal information, and wherein the relay node sends the synchronization signal in the bandwidth part based on the information about the bandwidth part corresponding to the synchronization signal information.

4. The method according to claim 1, wherein the synchronization signal information further comprises a transmit power corresponding to the synchronization signal, and the relay node sends the synchronization signal at the transmit power.

5. The method according to claim 1, wherein the method further comprises:
   receiving, by the relay node, an identifier of the relay node that is sent by the donor node, and obtaining the synchronization signal information of the relay node based on the identifier of the relay node.

6. A method comprising:
   sending, by a network node, synchronization signal information to a relay node through an air interface, the relay node being configured to access a wireless communication network through the network node, and the synchronization signal information being configured for the relay node and enabling the relay node to generate a synchronization signal of the relay node based on the synchronization signal information, wherein the synchronization signal information comprises a physical cell identifier (PCI) of the relay node that is different from a PCI of the network node, the PCI of the relay node enabling the relay node to generate a synchronization signal sequence of the synchronization signal based on the PCI of the relay node, and the synchronization signal information further comprising a synchronization signal subcarrier spacing, information about an operating frequency band of the relay node, and a synchronization signal periodicity; and
   receiving, by the network node, an acknowledgment message sent by the relay node in response to sending the synchronization signal information.

7. The method according to claim 6, wherein the method further comprises:
   receiving, by the network node, a synchronization signal information request sent by the relay node, wherein the synchronization signal information request requests the network node to send the synchronization signal information of the relay node to the relay node.

8. The method according to claim 6, wherein the method further comprises:
   receiving, by the network node, a synchronization signal information configuration request sent by an operation, administration and maintenance node, wherein the synchronization signal information configuration request instructs the network node to send the synchronization signal information to the relay node.

9. The method according to claim 6, wherein the synchronization signal information further comprises information about a bandwidth part corresponding to the synchronization signal information, for the relay node to send the synchronization signal in the bandwidth part based on the information about the bandwidth part corresponding to the synchronization signal information.

10. The method according to claim 6, wherein the synchronization signal information further comprises a transmit power corresponding to the synchronization signal.

11. A relay device, comprising:
- a receiver, configured to receive synchronization signal information sent by a donor node of the relay device through an air interface, the relay device being configured to access a wireless communication network through the donor node, the synchronization signal information being configured for the relay device and enabling the relay device to generate a synchronization signal of the relay device, and the synchronization signal information comprising a physical cell identifier (PCI) of the relay device that is different from a PCI of the donor node, and the synchronization signal information further comprising a synchronization signal subcarrier spacing, information about an operating frequency band of the relay device, and a synchronization signal periodicity;
- a processor, configured to generate a synchronization signal sequence based on the PCI of the relay device comprised in the synchronization signal information, to generate the synchronization signal of the relay device using the generated synchronization signal sequence; and
- a transmitter, configured to send the synchronization signal including the synchronization signal sequence generated by the processor.

12. The relay device according to claim 11, wherein the synchronization signal information further comprises information about a bandwidth part corresponding to the synchronization signal information, and wherein the transmitter sends the synchronization signal in the bandwidth part corresponding to the synchronization signal information.

13. The relay device according to claim 11, wherein the synchronization signal information further comprises a transmit power corresponding to the synchronization signal, and the transmitter sends the synchronization signal at the transmit power.

14. The relay device according to claim 11, wherein the processor is further configured to obtain an identifier of the relay device, and the processor obtains the synchronization signal information of the relay device based on the identifier of the relay device.

15. The relay device according to claim 11, wherein the receiver is further configured to receive an identifier of another relay device and synchronization signal information of the another relay device that are sent by the donor node; and
- the transmitter is further configured to forward the identifier of the another relay device and the synchronization signal information of the another relay device to the another relay device.

16. A network device, comprising:
- a processor, configured to generate synchronization signal information of a relay node, the relay node being configured to access a wireless communication network through the network device, and the synchronization signal information configured for the relay node and enabling the relay node to generate a synchronization signal of the relay node based on the synchronization signal information, wherein the synchronization signal information comprises a physical cell identifier (PCI) of the relay node that is different from a PCI of the network device, the PCI of the relay node enabling the relay node to generate a synchronization signal sequence of the synchronization signal based on the PCI, and the synchronization signal information further comprising a synchronization signal subcarrier spacing, information about an operating frequency band of the relay node, and a synchronization signal periodicity;
- a transmitter, configured to send the synchronization signal information to the relay node through an air interface; and
- a receiver, configured to receive an acknowledgment message sent by the relay node in response to sending the synchronization signal information.

17. The network device according to claim 16, wherein the receiver is further configured to receive a synchronization signal information request sent by the relay node, and the synchronization signal information request requests the network device to send the synchronization signal information of the relay node to the relay node.

* * * * *